United States Patent
Senda et al.

(10) Patent No.: US 8,131,452 B2
(45) Date of Patent: Mar. 6, 2012

(54) SYSTEM FOR RESTARTING INTERNAL COMBUSTION ENGINE WHEN ENGINE RESTART CONDITION IS MET

(75) Inventors: Takashi Senda, Niwa-gun (JP); Akira Kato, Kani (JP); Mitsuhiro Murata, Niwa-gun (JP); Masami Niimi, Handa (JP); Kenji Kawahara, Kariya (JP); Hideya Notani, Kariya (JP)

(73) Assignee: Denso Corporation, Kariya (JP)

( * ) Notice: Subject to any disclaimer, the term of this patent is extended or adjusted under 35 U.S.C. 154(b) by 267 days.

(21) Appl. No.: 12/691,227

(22) Filed: Jan. 21, 2010

(65) Prior Publication Data

US 2010/0180849 A1 Jul. 22, 2010

(30) Foreign Application Priority Data

Jan. 21, 2009 (JP) ................................. 2009-011444
May 20, 2009 (JP) ................................. 2009-121640

(51) Int. Cl.
  *F02D 41/26* (2006.01)
(52) U.S. Cl. ..................... 701/110; 701/113; 123/179.4
(58) Field of Classification Search .................. 701/110, 701/113; 123/179.3, 179.4, 179.28
  See application file for complete search history.

(56) References Cited

U.S. PATENT DOCUMENTS

| | | | |
|---|---|---|---|
| 7,275,509 B2 | 10/2007 | Kassner | |
| 7,614,377 B2 * | 11/2009 | Noguchi | 123/179.3 |
| 2001/0047785 A1 | 12/2001 | Osada et al. | |
| 2005/0228575 A1 | 10/2005 | Murakami et al. | |
| 2008/0127927 A1 | 6/2008 | Hirning et al. | |
| 2009/0020091 A1 * | 1/2009 | Botzenhard et al. | 123/179.3 |

FOREIGN PATENT DOCUMENTS

| | | |
|---|---|---|
| DE | 10 2005 049 092 A1 | 4/2007 |
| DE | 10 2006 011 644 A1 | 9/2007 |
| EP | 1 457 652 A2 | 9/2004 |
| EP | 2 159 410 A2 | 3/2010 |
| JP | A-11-030139 | 2/1999 |
| JP | A-2000-356161 | 12/2000 |
| JP | A-2003-3938 | 1/2003 |
| JP | A-2005-330813 | 12/2005 |

(Continued)

OTHER PUBLICATIONS

European Search Report issued on May 20, 2010 in European Patent Application No. 10000547.9.

(Continued)

*Primary Examiner* — Hai Huynh
(74) *Attorney, Agent, or Firm* — Oliff & Berridge, PLC

(57) ABSTRACT

In a system, an angle sensor outputs a pulse each time an output shaft of an internal combustion engine rotates by a preset angle, and a calculator calculates speed-change information indicative of a change in a speed of rotation of the output shaft based on the pulses outputted from the angle sensor. A determiner determines, based on the speed-change information, whether at least one of the pulses outputted from the angle sensor represents a proper timing for a preset of a pinion of a starter with a ring gear mounted on the output shaft. A pinion engaging unit shifts the pinion toward the ring gear so that the pinion is engaged with the ring gear when it is determined that the at least one of the pulses outputted from the angle sensor represents the proper timing for the preset of the pinion with the ring gear.

17 Claims, 12 Drawing Sheets

FOREIGN PATENT DOCUMENTS

| | | |
|---|---|---|
| JP | A-2006-112302 | 4/2006 |
| JP | A-2006-200416 | 8/2006 |
| JP | A-2006-258078 | 9/2006 |
| JP | A-2007-107527 | 4/2007 |
| JP | A-2008-510099 | 4/2008 |
| JP | A-2009-143306 | 7/2009 |
| JP | 2010-270635 * | 12/2010 |
| WO | WO 2006/018350 A2 | 2/2006 |
| WO | WO 2006/120180 A2 | 11/2006 |
| WO | WO 2009/083477 A1 | 7/2009 |

OTHER PUBLICATIONS

Japanese Office Action dated Jan. 5, 2011 in Japanese Patent Application No. 2009-121640 (with translation).

* cited by examiner

SYSTEM FOR RESTARTING INTERNAL COMBUSTION ENGINE WHEN ENGINE RESTART CONDITION IS MET

CROSS REFERENCE TO RELATED APPLICATIONS

This application is based on Japanese Patent Applications 2009-011444 and 2009-121640 filed on Jan. 21, 2009 and May 20, 2009, respectively. This application claims the benefit of priority from the Japanese Patent Applications, so that the descriptions of which are all incorporated herein by reference.

FIELD OF THE INVENTION

The present invention relates to systems for restarting internal combustion engines when at least one of predetermined engine restart conditions is met.

BACKGROUND OF THE INVENTION

Some types of vehicles installed with an engine stop-and-start system, such as an idle reduction control system, have been recently developed for reduction in fuel cost, in exhaust emission, and the like. Such engine stop-and-start systems are designed to, in response to a driver's engine stop operation, shut off fuel supplied to an internal combustion engine of a vehicle so as to automatically stop it. After the stop of the internal combustion engine, these engine stop-and-start systems are designed to cause, in response to a driver's Operation to restart the vehicle, a starter to crank the internal combustion engine, thus restarting the internal combustion engine.

In normal starters, a pinion is shifted by an actuator toward a ring gear coupled to a crankshaft of an internal combustion engine to be engaged with the ring gear. While being meshed with the ring gear, the pinion is rotatably driven by a motor so that the crankshaft is rotated. This, cranks the internal combustion engine.

In conventional normal starters, when an internal combustion engine is restarted, the actuator and motor are designed to be simultaneously driven to carry out the engaging process of the pinion with the ring gear. The structure may produce, when the pinion is shifted to be engaged with the ring gear, loud noise due to the strike and/or the friction therebetween. This may be irritating and unpleasant for the occupant(s), and/or may delay a time required to restart the internal combustion engine by a time required for the pinion to be engaged with the ring gear. The latter problem may cause the occupant(s) to feel acceleration at the engine restart insufficient.

In order to address these problems, U.S. Pat. No. 7,275,509 corresponding to Germany Patent Application Publication No. DE 10 2005 049 092 and to Japanese Patent Application Publication No. 2007-107527 discloses a system for a starter of an internal combustion engine.

The disclosed system, referred to as "first system", is designed such that the motor and actuator of a starter are separately drivable. During the internal combustion engine being automatically run down, in other words, during the crankshaft (engine) coasting (being rotated without the aid of the internal combustion engine), when the rotational speed of the internal combustion engine drops into a very low-speed range of 300 RPM or less, more specifically, 50 to 100 RPM, the first system drives the actuator to thereby shift the pinion to be meshed with the ring gear.

The first system is also designed to address the following problem. Specifically, immediately before the stop of the forward rotation of the internal combustion engine, because the piston of the engine does not pass the top dead center of a cylinder, the engine is reversely rotated. During the reverse rotation of the engine, when the pinion is shifted to be engaged with the ring gear, the engagement may produce loud noise due to the impact and/or the friction therebetween. This may be irritating and unpleasant for the occupant(s).

In order to solve the problem, the first system is equipped with a first sensor and a second sensor each designed as a normal magnetic-pickup type crankshaft sensor.

Each of the first and second sensors includes a reluctor disk coupled to the internal combustion engine. The reluctor disk includes an alternating arrangement of teeth and tooth spaces. Each of the first and second sensors is designed to pick up a change in a previously formed magnetic field according to the rotation of the teeth of the reluctor disk (crankshaft) to thereby generate a pulse signal; this pulse signal consists of a train of pulses (each pulse is a transition of a base signal level to a preset signal level). Each of the pulses is detected by each of the first and second sensors when one tooth of the rotating reluctor disk passes in front of a corresponding one of the first and second sensors.

The first system receives the pulse signal generated by each of the first and second sensors, and grasps the rotational speed of the internal combustion engine based on intervals between the pulses of the pulse signal generated by at least one of the first and second sensors.

The rotational direction of the crankshaft is ascertained by utilizing: one of a rising and falling edge of one pulse of the pulse signal of one of the first and second sensors; and a signal level (the base signal level or preset signal level) of the electrical signal of the other of the first and second sensors.

The first system drives the actuator to shift the pinion to be engaged with the ring gear when: the rotational speed of the internal combustion engine drops into the very low-speed range; and the rotational direction of the crankshaft corresponds to the forward rotational direction.

Additionally, US Patent Application Publication No. 2008/0127927 corresponding to WO Publication No. 2006/018350 and to Published Japanese translation No. 2008-510099 of the WO Publication No. 2006/018350 discloses a device for starting an internal combustion engine.

The disclosed device is provided with an ECU for controlling the actuator and motor of a starter, and a current adjuster for adjusting the level of a current to be supplied to the actuator.

The disclosed device uses a normal magnetic-pickup type crankshaft sensor set forth above so that the ECU receives the pulse signal generated by the crankshaft sensor, and detects the rotational speed of the internal combustion engine based on intervals between the pulses of the pulse signal generated by the crankshaft sensor.

During the internal combustion engine being automatically run down, when the rotational speed of the internal combustion engine drops to be lower than a preset threshold, the ECU controls the current adjuster to activate the actuator by an adjusted low current to shift the pinion to be engaged with the ring gear. Thereafter, after the rotation of the crankshaft has been completely stopped, the ECU activates the motor to rotate the pinion, thus cranking the internal combustion engine.

Furthermore, Japanese Patent Application Publication No. H11-030139 discloses an engine stop and start system.

The disclosed system, referred to as "second system", is equipped with such a normal magnetic-pickup type crankshaft sensor for measuring the rotation of the crankshaft of an internal combustion engine. The second system is designed to, when the crankshaft sensor measures that the rotation of the crankshaft of the internal combustion engine is completely stopped, activate the actuator of a starter by a low voltage to shift the pinion to be engaged with the ring gear.

SUMMARY OF THE INVENTION

The inventors have discovered that there is a problem in the first system. The problem is that, in order to engage, with low noise, the pinion with the ring gear coupled to the crankshaft of the engine, the first system requires the first and second sensors for detecting the reverse rotation of the engine. This may make it difficult to meet low-cost requirements for vehicles as recent important technical requirements.

The inventors also have discovered that there are some problems in the disclosed device.

As well as the problem in the first system, in order to engage, with low noise, the pinion with the ring gear coupled to the crankshaft of the engine, the disclosed device requires the current adjuster for adjusting the level of a current to be supplied to the actuator. This may cause the first problem of making it difficult to meet low-cost requirements for vehicles as recent important technical requirements.

In addition, the disclosed device detects the rotational speed of the internal combustion engine based on the intervals between the pulses of the pulse signal generated by the normal magnetic-pickup type crankshaft sensor. The normal magnetic-pickup type crankshaft sensor is designed to pick up a change in the previously formed magnetic field according to the rotation of the teeth of the reluctor disk (crankshaft) to thereby generate the pulse signal.

That is, during the internal combustion engine being automatically run down, the ECU determines whether the detected rotational speed of the internal combustion engine drops into the very low-speed range in order to decide the timing of the shift of the pinion to the ring gear.

However, as described above, the rotational-speed resolution of the normal magnetic-pickup type crankshaft sensor is limited depending on the tooth pitches thereof. This may cause the second problem of making it difficult to detect, with high accuracy, the rotational speed of the crankshaft within the very low-speed range or therearound.

Most types of crankshaft sensors are designed to detect a physical change caused by the rotation of the crankshaft, and therefore, this second problem may occur independently of the type of a crankshaft sensor to be used for the disclosed device.

The second system detects the rotational speed of the internal combustion engine based on the intervals between the pulses of the pulse signal generated by the normal magnetic-pickup type crankshaft sensor as well as the disclosed device. Thus, the inventors have discovered that there is a problem in the second system; this problem is the same as the second problem that may occur in the disclosed device.

Additionally, the second system is designed to activate the actuator of the starter by a low voltage to shift the pinion to be engaged with the ring gear only after the rotation of the crankshaft of the internal combustion engine is completely stopped. Thus, the inventors have discovered that there is an alternative problem in the second system; this problem is that the restart of the engine may be delayed.

In view of the circumstances set force above, the present invention seeks to provide systems for restarting an internal combustion engine; these systems are designed to solve at least one of the problems set forth above.

Specifically, the present invention aims at providing systems for restarting an internal combustion engine; these systems are designed to determine a proper timing of the engagement of a pinion of a starter with a ring gear coupled to the internal combustion engine. Preferably, the systems are capable of carrying out the determination of the proper pinion-engagement timing without increasing the starter and the systems themselves in cost.

According to one aspect of the present invention, there is provided a system that presets a pinion of a starter on a ring gear mounted on an output shaft of an internal combustion engine during the internal combustion engine coasting by engine stop control, and that rotates, after the preset of the pinion on the ring gear, the pinion to thereby crank the internal combustion engine. The system includes an angle sensor that outputs a pulse each time the output shaft rotates by a preset angle, and a calculator that calculates speed-change information indicative of a change in a speed of rotation of the output shaft based on the pulses outputted from the angle sensor. The system includes a determiner that determines, based on the speed-change information, whether at least one of the pulses outputted from the angle sensor represents a proper timing for the preset of the pinion with the ring gear. The system includes a pinion engaging unit that shifts the pinion toward the ring gear so that the pinion is engaged with the ring gear when it is determined that the at least one of the pulses outputted from the angle sensor represents the proper timing for the preset of the pinion with the ring gear.

In a preferred embodiment of this one aspect, the determiner is configured to determine, based on the speed-change information, whether each of the pulses outputted from the angle sensor represents, as the proper timing for the preset of the pinion with the ring gear, a last pulse during a forward rotation of the output shaft. In the preferred embodiment of this one aspect, the pinion engaging unit is configured to shift the pinion toward the ring gear so that the pinion is engaged with the ring gear when it is determined that one pulse outputted from the angle sensor as the at least one pulse represents the last pulse during the forward rotation of the output shaft.

The configuration of the system according to the one aspect of the present invention shifts the pinion toward the ring gear so that the pinion is engaged with the ring gear when it is determined that the at least one of the pulses outputted from the angle sensor represents the proper timing for the preset of the pinion with the ring gear. For example, when it is determined that one pulse outputted from the angle sensor as the at least one pulse represents the last pulse during the forward rotation of the output shaft, the pinion engaging unit is configured to shift the pinion toward the ring gear so that the pinion is engaged with the ring gear.

Thus, the system according to the one aspect of the present invention determines the proper timing for the preset of the pinion with the ring gear without using any sensor for detecting reverse rotation of the internal combustion engine like the first system described in the BACKGROUND OF THE INVENTION of the specification.

Additionally, in the preferred embodiment, the pinion is shifted toward the ring gear at the timing when the last pulse outputted from the angle sensor during the forward rotation of the output shaft appears; this last pulse appears immediately before the stop of the rotation of the internal combustion engine or the reverse rotation thereof. Thus, it is possible to reliably shift the pinion toward the ring gear while the speed of rotation of the output shaft is within a very low speed range during the forward rotation of the internal combustion engine. This reduces noise due to the shift of the pinion to the ring gear without using functions of driving the pinion 13 at a low current or low voltage like the conventional device or the conventional second system described in the BACK-GROUND OF THE INVENTION of the specification.

Accordingly, the one aspect of the present invention achieves an advantage of carrying out the preset of the pinion 13 to the ring gear 23 at low noise and at low cost, thus meeting low-cost requirements for vehicles as recent important technical requirements.

According to an alternative aspect of the present invention, there is provided a system that presets a pinion of a starter on a ring gear mounted on a output shaft of an internal combustion engine during the internal combustion engine coasting by engine stop control, and that rotates, after the preset of the pinion on the ring gear, the pinion to thereby crank the internal combustion engine. The system includes an engine-speed calculator that calculates a rotational speed of the internal combustion engine based on rotation of the output shaft, and an estimator that estimates, based on the rotational speed of the internal combustion engine, a trajectory of a change in the rotational speed of the internal combustion engine during the internal combustion engine coasting. The system includes a controller that adjusts, based on the trajectory of the change in the rotational speed estimated by the estimator, a timing of the pinion being engaged with the ring gear.

Specifically, as described in the BACKGROUND OF THE INVENTION of the specification, the rotational-speed resolution of the normal magnetic-pickup type crankshaft sensor is limited depending on the tooth pitches thereof. This may make it difficult to detect, with high accuracy, the rotational speed of the crankshaft within a very low-speed range or therearound. This may increase noise due to the engagement of the pinion with the ring gear.

In view of these circumstances, the configuration of the system according to the alternative aspect of the present invention estimates, based on the rotational speed of the internal combustion engine, the trajectory of the change in the rotational speed of the internal combustion engine during the internal combustion engine coasting. Specifically, the trajectory of the change in the rotational speed of the internal combustion engine includes such a very low-speed range or therearound. Based on the trajectory of the change in the rotational speed estimated by the estimator, the configuration of the system adjusts the timing of the pinion being engaged with the ring gear.

This configuration achieves an advantage of carrying out the engagement (preset) of the pinion with the ring gear at a proper timing, thus reducing noise due to the engagement of the pinion with the ring gear.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
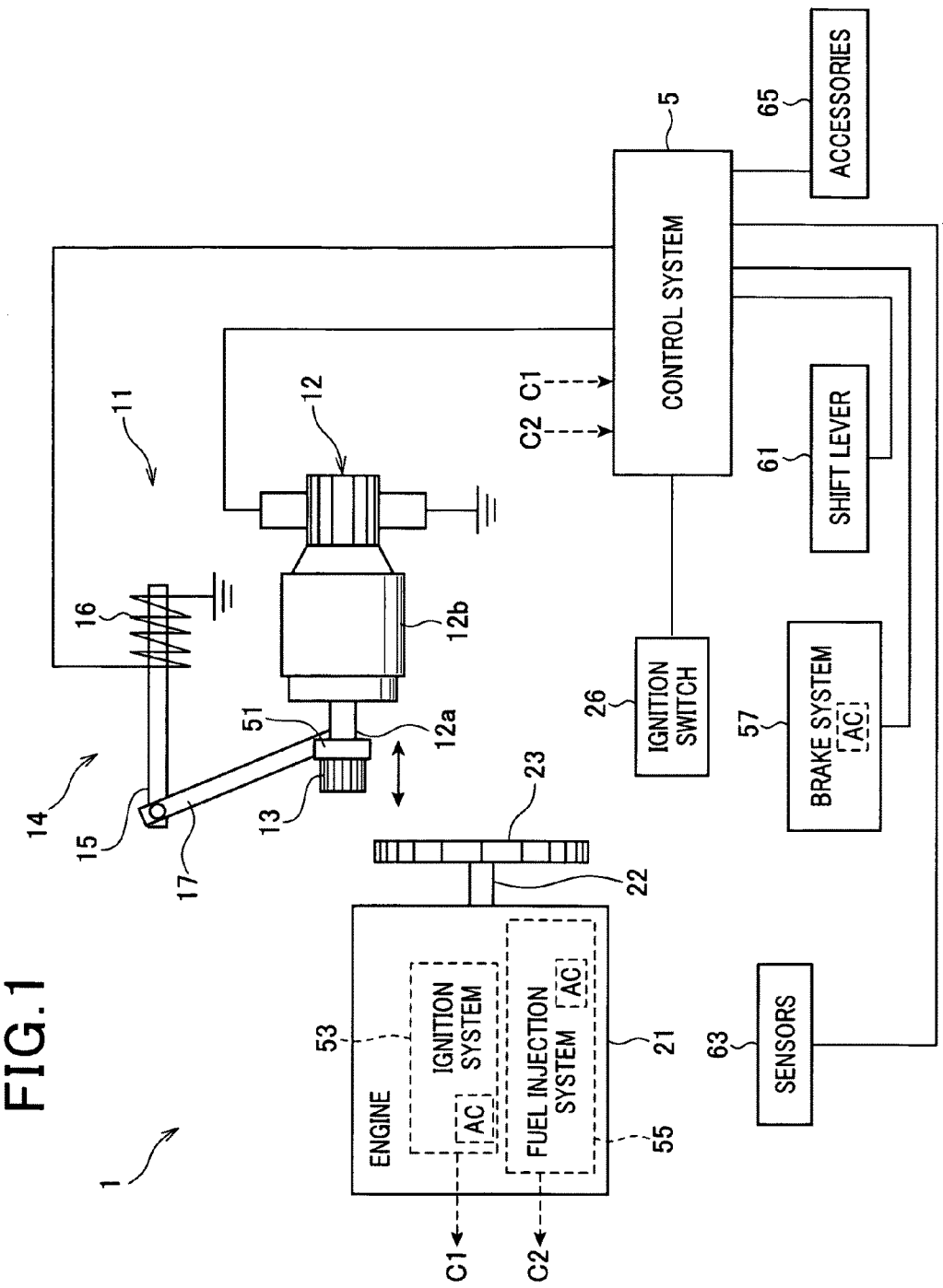
FIG. 1 is a view schematically illustrating an example of the overall hardware structure of an engine starting system according to the first embodiment of the present invention.

Embodiments of the present invention will be described hereinafter with reference to the accompanying drawings. In the drawings, identical reference characters are utilized to identify identical corresponding components.

First Embodiment

An engine starting system 1 for an internal combustion engine 21 installed in a vehicle according to the first embodiment of the present invention will be described hereinafter with reference to FIGS. 1 to 6. The engine starting system 1 includes a control system 5 for controlling, for example, overall operations of the vehicle.

The internal combustion engine, referred to simply as "engine", 21 has a crankshaft 22, as an output shaft of the engine 21, with one end on which a ring gear 23 is mounted.

The engine 21 works to compress air-fuel mixture or air by a moving piston within each cylinder, and burn the compressed air-fuel mixture or the mixture of the compressed air and fuel within each cylinder to change the fuel energy to mechanical energy, such as rotative energy, thus rotating the crankshaft 22. The rotation of the crankshaft 22 is transferred to driving wheels through a powertrain installed in the vehicle to thereby drive the vehicle. Oil (engine oil) is within each cylinder to lubricate any two parts placed in the engine 21 to be in contact with each other, such as the moving piston and each cylinder.

In the vehicle, for controlling the engine 21, an ignition system 53 and a fuel injection system 55 are for example installed.

The ignition system 53 includes actuators, such as igniters, AC and causes the actuators AC to provide an electric current or spark to ignite an air-fuel mixture in each cylinder of the engine 21, thus burning the air-fuel mixture.

The fuel injection system 55 includes actuators, such as fuel injectors, AC and causes the actuators AC to spray fuel either directly into each cylinder of the engine 21 or into an intake manifold (or intake port) just ahead of each cylinder thereof to thereby burn the air-fuel mixture in each cylinder of the engine 21. When the internal combustion engine is designed as a diesel engine, the ignition system 53 can be eliminated.

In addition, in the vehicle, for slowing down or stopping the vehicle, a brake system 57 is installed.

The brake system 57 includes, for example, disc or drum brakes as actuators AC at each wheel of the vehicle. The brake system 57 is operative to send, to each of the brakes, a deceleration signal indicative of a braking force to be applied from each brake to a corresponding one of the wheels in response to a brake pedal of the vehicle being depressed by the driver. This causes each brake to slow down or stop the rotation of a corresponding one of the wheels of the vehicle based on the sent deceleration signal.

Reference numeral 61 represents a hand-operable shift lever (select lever). When the vehicle is a manual transmission vehicle, the driver can change a position of the shift lever 61 to shift (change) a transmission gear ratio of the powertrain to thereby control the number of revolutions of the driving wheels and the torque generated by the engine 21 to the driving wheels. When the vehicle is an automatic transmission vehicle, the driver can change a position of the shift lever 61 to shift one of the drive ranges corresponding to a transmission gear ratio of the powertrain, such as Reverse range, Neutral range, Drive range, and the like.

In addition, in the vehicle, for measuring the operating conditions of the engine 21 and the driving conditions of the vehicle, sensors 63 are installed in the vehicle.

Each of the sensors 63 is operative to measure an instant value of a corresponding one parameter associated with the operating conditions of the engine 21 and/or the vehicle and to output, to the control system 5, data indicative of the measured value of a corresponding one parameter.

Specifically, the sensors 63 include, for example, temperature sensors 27, a crank angle sensor (crankshaft sensor) 29, a cam angle sensor, an accelerator sensor (throttle position sensor), and a brake sensor; these sensors are electrically connected to the control system 5.

The temperature sensors 27 are operative to measure temperature information associated with the temperature of an engine coolant, the air temperature around the vehicle, the temperature of the engine oil, and the like, and output, to the control system 5, a signal indicative of the measured temperature information.

The crank angle sensor 29 is operative to output, to the control system 5, a pulse every time the crankshaft 22 is rotated by a preset angle. An example of the specific structure of the crank angle sensor 26 will be described later.

The cam angle sensor is operative to measure the rotational position of a camshaft (not shown) as an output shaft of the engine 21, and output, to the control system 5, a signal indicative of the measured rotational position of the camshaft. The camshaft is driven by gears, a belt, or a chain from the crankshaft 22, and is designed to turn at half the speed of the crankshaft 22. The camshaft is operative to cause various valves in the engine 21 to open and close.

The accelerator sensor is operative to:

measure an actual position or stroke of a driver-operable accelerator pedal of the vehicle linked to a throttle valve for controlling the amount of air entering the intake manifold; and output, as data representing a driver's starting request, acceleration request, or deceleration request for the engine 21, the measured actual stroke or position of the accelerator pedal.

The brake sensor is operative to measure an actual position or stroke of the brake pedal of the vehicle operable by the driver and to output, as data representing a driver's deceleration request, the measured actual stroke or position of the brake pedal.

Figure 2:
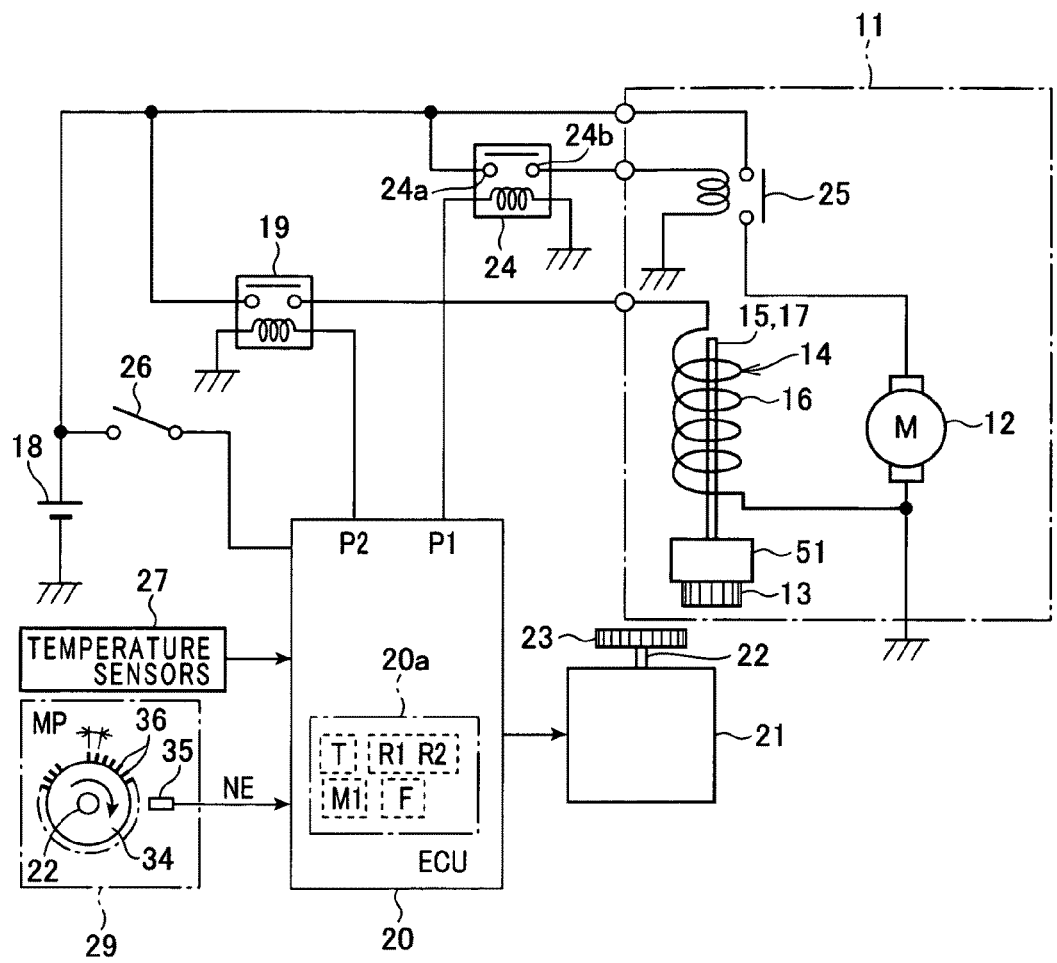
FIG. 2 is a schematic system configuration diagram of the engine starting system according to the first embodiment.
Figure 3:
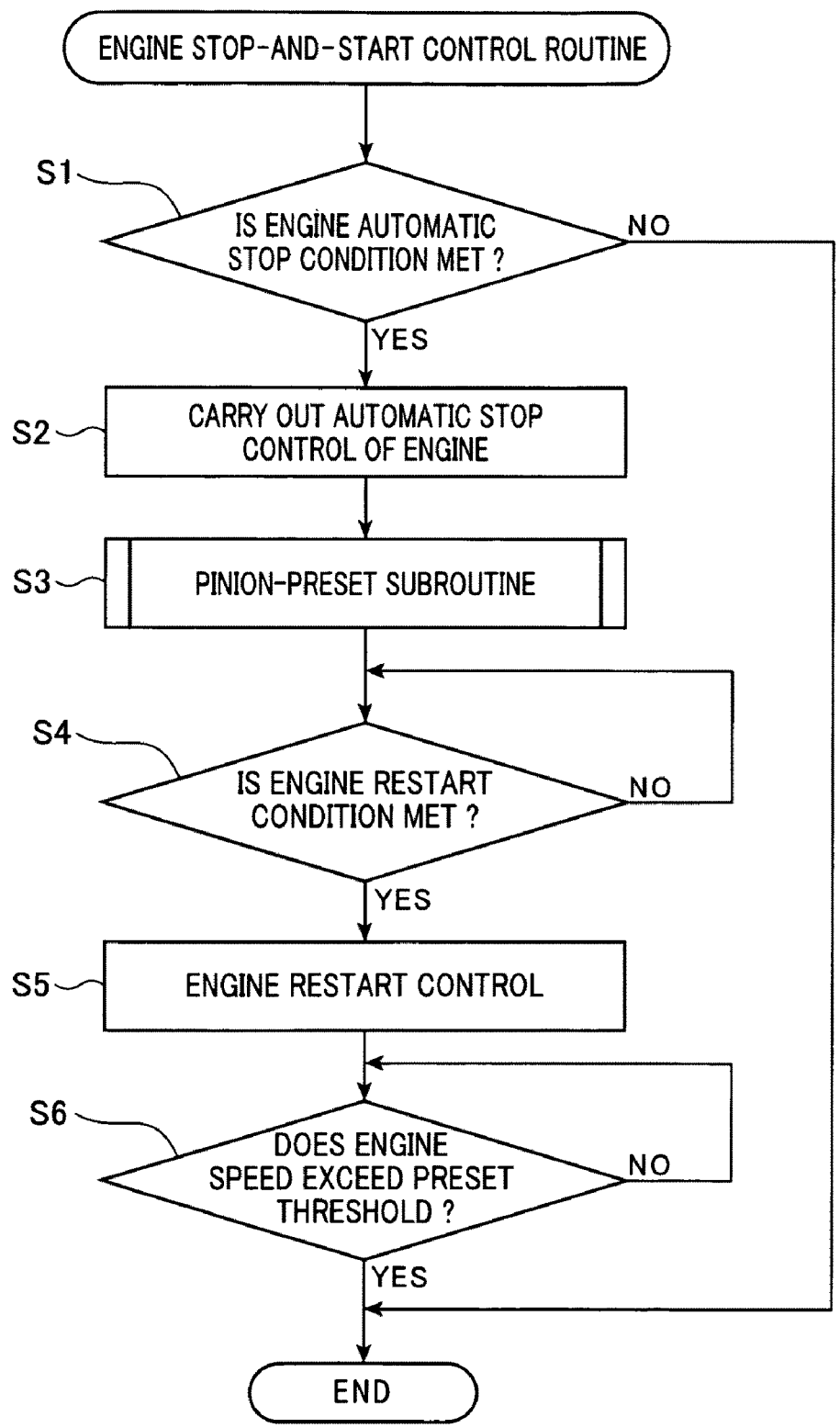
FIG. 3 is a flowchart schematically illustrating an engine stop-and-start control routine to be executed by an ECU illustrated in FIG. 2 according to the first embodiment.

Referring to FIGS. 1 and 2, the engine starting system 1 includes a starter 11, a battery 18, a relay 19, an ECU (Electronic Control System) 20, and a switching element 24. For example, the battery 18, the relay 19, the ECU 20, and the switching element 24 serve as the control system 5.

The starter 11 is provided with a starter motor 12, a pinion 13, a one-way clutch 51, and an electromagnetic actuator 14. The one-way clutch 51 can be omitted.

The starter motor 12 is made up of an output shaft 12*a*, an armature 12*b* coupled thereto, and a motor switch 25 electrically connected to the armature 12*b*. The starter motor 12 is operative to rotate the output shaft 12*a* when the armature 12*b* is energized via the motor switch 25.

The one-way clutch 51 is provided in helical spline engagement with an outer circumference of one end of the output shaft 12*a*.

The pinion 13 is mounted on the one-way clutch 51 around the outer circumferential of the output shaft 12*a* to be shiftable together with the one-way clutch 51 in an axial direction of the output shaft 12*a*.

The starter motor 12 is arranged opposing the engine 21 such that the shift of the pinion 13 in the axial direction of the output shaft 12*a* toward the engine 21 allows the pinion 13 to abut on the ring gear 23 of the engine 21.

The electromagnetic actuator, referred to simply as "actuator", 14 is made up of, for example, a plunger 15, a solenoid 16, and a shift lever 17. The plunger 15 is so arranged in parallel to the axial direction of the output shaft 12*a* of the starter motor 12 as to be shiftable in its length direction parallel to the axial direction of the output shaft 12*a*.

The solenoid 16 is arranged to surround the plunger 15. One end of the solenoid 16 is electrically connected to a positive terminal of the battery 18 via the relay 19, and the other end thereof is grounded. The shift lever 17 has one end and the other end in its length direction. The one end of the shift lever 17 is pivotally coupled to one end of the plunger 15, and the other end of the shift lever 17 is coupled to the one-way clutch 51. The shift lever 17 is pivoted about a pivot located at its substantially center in the length direction.

The solenoid 16 works to shift the plunger 15 thereinto in its length direction so as to pull it thereinto against the force of return spring (not shown) when energized. The pull-in shift of the plunger 15 pivots the shift lever 17 clockwise in FIG. 1 whereby the pinion 13 is shifted toward the ring gear 23 of the engine 21 via the shift lever 17. This allows the pinion 13 to be meshed with the ring gear 23 for cranking the engine 21. When the solenoid 16 is deenergized, the return spring returns the plunger 15 and the shift lever 17 to their original positions illustrated in FIG. 1 so that the pinion 13 is pulled-out of mesh with the ring gear 23.

The one-way clutch 51 works to transfer rotational motion supplied from the starter motor 12 to the pinion 13 without transferring rotational motion supplied from the pinion 13 to the starter motor 12. With this structure, even if the rotational speed of the engine 21 (ring gear 23) is higher than that of the pinion 13 during the pinion 13 being meshed with the ring gear 23, the one-way clutch 51 becomes unlocked so that the pinion 13 and the one-way clutch 51 idle. This prevents the rotation of the ring gear 23 (pinion 13) from being transferred to the starter motor 12.

The relay 19 is designed as a mechanical relay or a semiconductor relay. The relay 19 has first and second terminals (contacts) electrically connected to the positive terminal of the battery 18 and the one end of the solenoid 16, respectively. The relay 19 also has a control terminal electrically connected to an output port P2 of the ECU 20.

For example, when an electric signal indicative of switch-on of the relay 19 is sent from the ECU 20 to the relay 19 via the output port P2, the relay 19 establishes electric conduction between the first and second terminals to thereby allow the battery 18 to apply a DC (Direct Current) battery voltage to the solenoid 16.

Otherwise, when an electric signal indicative of switch-off of the relay 19 in on state is sent from the ECU 20 to the relay 19 via the output port P2, the relay 19 interrupts the electric conduction between the first and second terminals to thereby disconnect the battery 18 from the solenoid 16.

The switching element 24 is designed as, for example, a mechanical relay. For example, the switching element 24 includes a solenoid 24a and a switch 24b.

The solenoid 24a has one end and the other end, the one end of which is electrically connected to an output port P1 of the ECU 20, the other end of which is grounded. The switch 24b is electrically connected between the positive terminal of the battery 18 and the motor switch 25.

When an electric signal indicative of switch-on of the switching element 24 is sent from the ECU 20 via the output port P1 so that the solenoid 24a is energized, the switch 24b is turned on by the energized solenoid 24a, thus turning on the motor switch 25. This establishes electrical conduction between the armature 12b and the battery 18. This energizes the armature 12b of the starter motor 12 to thereby rotatably drive the pinion 13.

Otherwise, when an electric signal indicative of switch-off of the switching element 24 in on state is sent from the ECU 20 via the output port P1 so that the solenoid 24a is deenergized, the switch 24b is turned off by the deenergized solenoid 24a, thus turning off the motor switch 25. This interrupts electrical conduction between the armature 12b and the battery 18, thus stopping the rotation of the pinion 13 (starter motor 12).

Referring to FIG. 2, the crank angle sensor 29 includes a rector disk (pulser) 34 coupled to the crankshaft 22 to be integrally rotated therewith. The crank angle sensor 29 also includes an electromagnetic pickup (referred to simply as "pickup") 35 arranged in proximity to the reluctor disk 34.

The reluctor disk 34 has teeth 36, spaced at preset crank-angle intervals, for example, 30° intervals ($\pi/6$ radian intervals), around the outer circumference of the disk 34. The rectangular disk 34 also has, for example, one tooth missing portion MP at which a preset number of teeth, such as two teeth, are missed. The preset crank-angle intervals define a crank-angle measurement resolution R of the crank angle sensor 29. For example, when the teeth 36 are spaced at 30-degree intervals, the crank-angle measurement resolution R is set to 30 degrees.

The pickup 35 is designed to pick up a change in a previously formed magnetic field according to the rotation of the teeth 36 of the reluctor disk 34 to thereby generate a pulse, which is a transition of a base signal level to a preset signal level.

Specifically, the pickup 35 is operative to output a pulse every time one tooth 36 of the rotating reluctor disk 34 passes in front of the pickup 35.

The train of pulses outputted from the pickup 35, which is referred to as "NE signal", is sent to the control system 5; this NE signal is used by the control system 5 to calculate the rotational speed NE of the engine 21.

An ignition switch 26 is provided in the vehicle and electrically connected between the positive terminal of the battery 18 and the ECU 20. For example, when an ignition key of the vehicle is inserted in a key cylinder thereof to be operated by the driver to an ignition position, the ignition switch 26 is turned on so that the DC power voltage is applied to the ECU 20 from the battery 18. This activates the ECU 20.

The ECU 20 is designed as, for example, a normal microcomputer circuit consisting of, for example, a CPU, a storage medium 20a including a ROM (Read Only Memory), such as a rewritable ROM, a RAM (Random Access Memory), and the like, an IO (Input and output) interface, and so on.

The storage medium 20a stores therein a map M1 designed as, for example, a data table or a program. The map M1 represents a function (relationship) between a variable of the crank angle of the engine 21, a variable of the temperature of the engine coolant, and a variable of engine friction torque T. The function can have been determined based on data obtained by tests using the engine 21 or its equivalent computer model. The function also can have been determined based on design data of the engine 21.

Note that the engine friction torque T means a torque consumed by friction between any two parts placed in the engine 21 to be in contact with each other, such as the moving piston and each cylinder; the magnitude of the friction force depends on the temperature of each of the engine parts. Thus, the engine friction torque T can be represented as the function of the variable of the crank angle of the engine 21 and that of the temperature of the engine coolant.

The storage medium 20a also stores therein the inertia (the moment of inertia) of the engine 21. The inertia of the engine 21 has been calculated to be stored in the storage medium 20a as a file F.

The storage medium 20a stores therein beforehand various engine control programs.

The ECU 20 is operative to:
receive pieces of data measured by the sensors 63 and sent therefrom; and
control, based on the operating conditions of the engine 21 determined by at least some of the received pieces of data measured by the sensors 63, various actuators AC installed in the engine 21 to thereby adjust various controlled variables of the engine 21.

For example, the ECU 20 is operative to determine, based on the NE signal outputted from the crank angle sensor 29, a rotational position (crank angular position) of the crankshaft 22 relative to a reference position and the rotational speed NE of the engine 21. The rotational speed NE of the engine 21 will be referred to simply as "engine speed NE", hereinafter. For example, the ECU 20 is operative to calculate, based on intervals of pulses of the NE signal or the width of each pulse of the NE signal, the engine speed NE. The reference position can be determined based on the location of the tooth missing portion MP and/or on the signal outputted form the camshaft sensor.

Specifically, the ECU 20 is programmed to:

compute a proper ignition timing for the igniter AC for each cylinder, and a proper fuel injection timing and a proper injection quantity for the fuel injector AC for each cylinder;

instruct the igniter AC for each cylinder to ignite an air-fuel mixture in each cylinder at a corresponding computed proper ignition timing; and instruct the fuel injector AC for each cylinder to spray, at a corresponding computed proper injection timing, a corresponding computed proper quantity of fuel into each cylinder.

In addition, the engine control programs stored in the storage medium 20a include an engine stop-and-start control routine (program) R1. The ECU 20 repeatedly runs the engine stop-and-start control routine R1 in a given cycle during its being energized to carry out an engine stop-and-start control task T, in other words, idle reduction control task T.

Specifically, in accordance with the engine stop-and-start control routine R1, the ECU 20 repetitively determines whether at least one of predetermined engine automatic stop conditions is met based on the data measured by the sensors 63 in step S1.

Upon determining that no predetermined engine automatic stop conditions are met based on the data measured by the sensors 63 (NO in step S1), the ECU 20 exits the engine stop-and-start control routine R1.

In contrast, when the driver operates the accelerator pedal to fully close the throttle valve or operates the brake pedal during the vehicle running so that the vehicle is in a preset deceleration state in which the vehicle is likely to be stopped, the ECU 20 determines that an engine automatic stop request occurs, in other words, at least one of the engine automatic stop conditions is met (YES in step S1). Moreover, when the vehicle is stopped with the brake pedal being operated, the ECU 20 determines that the engine automatic stop request occurs, in other words, at least one of the engine automatic stop conditions is met (YES in step S1 of FIG. 3).

Then, the ECU 20 carries out automatic stop control of the engine 21 in step S2. Specifically, the ECU 20 controls the ignition system 53 and/or the fuel injection system 55 to stop the burning of the air-fuel mixture in each cylinder. The stop of the burning of the air-fuel mixture in each cylinder of the engine 21 means the automatic stop of the engine 21.

After the automatic stop of the engine 21, during the rotational speed of the engine 21 automatically dropping, in other words, the crankshaft 22 coasting, the ECU 20 carries out a pinion-preset subroutine R2 to thereby preset the pinion 13 to be engaged with the ring gear 23 and maintain the pinion 13 meshed with the ring gear 23 in step S3. Note that the ECU 20 can carry out the operation in step S3 when at least one of the engine automatic stop conditions is met (the determination in step S1 is YES). That is, the ECU 20 can carry out the pinion-preset subroutine R2 in parallel to executing the engine automatic stop control.

Thereafter, the ECU 20 determines whether an engine restart request occurs based on the data measured by the sensors 63 and data inputted from another device installed in the vehicle in step S4. In other words, the ECU determines whether at least one of engine restart conditions is met based on the data measured by the sensors 63 and a restart instruction inputted from accessories 65 installed in the vehicle in step S4. For example, the accessories 65 are designed to be driven by the engine 20. The accessories 65 include, for example, a battery-charge control system for controlling the SOC (State Of Charge) of the battery 18 or another battery and an air conditioner for controlling the temperature and/or humidity within the cab of the vehicle.

When the engine automatic stop request is released during the vehicle running, for example, the throttle valve is shifted from the fully close position, the ECU 20 determines that the engine restart request occurs, in other words, that at least one of the engine restart conditions is met in step S4. Moreover, when the driver, for example, releases the brake pedal or operates the shift lever 61 in preparation to the restart of the vehicle during the vehicle being stopped, the ECU 20 determines that the engine restart request occurs, in other words, that at least one of the engine restart conditions is met in step S4. In addition, the driver, for example, depresses the accelerator pedal to restart the vehicle, the ECU 20 determines that the engine restart request occurs, in other words, that at least one of the engine restart conditions is met in step S4.

Then, the ECU 20 carries out engine restart control of the engine 21 in step S5. Specifically, the ECU 20 sends, to the switching element 24 via the output port P 1, the electric signal indicative of switch-on of the switching element 24. This energizes the solenoid 24a to turn on the switch 24b. This turns the motor switch 25 on, thus exciting the armature 12b of the starter motor 12 to thereby rotatably drive the pinion 13.

Because the pinion 13 is preset to be meshed with the ring gear 23, the rotation of the pinion 13 cranks the engine 21.

During execution of the engine stop-and-start control routine R1, the ECU 20 monitors the engine speed NE. After execution of the engine restart control in step S5, when the monitored engine speed NE exceeds a preset threshold for determining whether the engine restart is completed in step S6.

Upon determining that the monitored engine speed NE does not exceed the preset threshold (NO in step S6), the ECU 20 repeats the determining process in step S6.

Otherwise, upon determining that the monitored engine speed NE exceeds the preset threshold (YES in step S6), the ECU 20 determines that the engine restart is completed, and exits the engine stop-and-start control routine R1 (engine stop-and-start control task T).

The pinion-preset subroutine R2 functions the ECU 20 as a determiner to determine whether one pulse of the NE signal outputted from the crank angle sensor 29 is the last pulse during the forward rotation of the crankshaft 22 of the engine 21. The pinion-preset subroutine R2 also functions as the ECU 20 as a driver to drive the actuator 14 to thereby shift the pinion 13 toward the ring gear 23 to be engaged therewith.

How to determine that one pulse of the NE signal outputted from the crank angle sensor 29 is the last pulse during the forward rotation of the crankshaft 22 of the engine 21 is based on the rotating behavior of the engine 21 (crankshaft 22) after the stop of the burning of the air-fuel mixture. In other words, how to determine that one pulse of the NE signal outputted from the crank angle sensor 29 is the last pulse during the forward rotation of the crankshaft 22 of the engine 21 is based on the behavior of the fluctuations of the engine speed during the engine 21 forward coasting (see FIG. 4).

Figure 4:
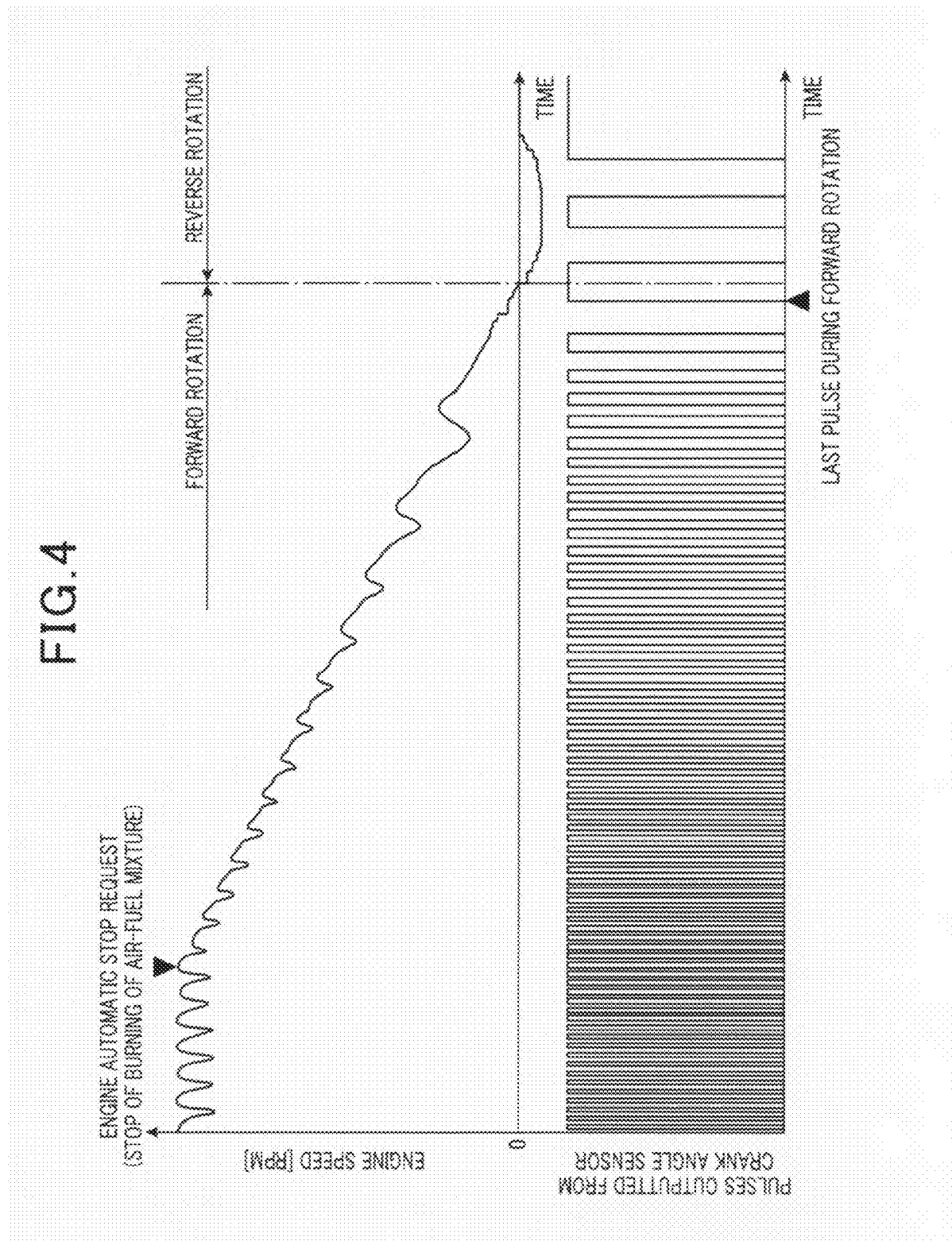
FIG. 4 is a timing chart schematically illustrating a relationship between the behavior of an engine speed and pulses of an NE signal outputted from a crank angle sensor illustrated in FIG. 2 according to the first embodiment.
Figure 5:
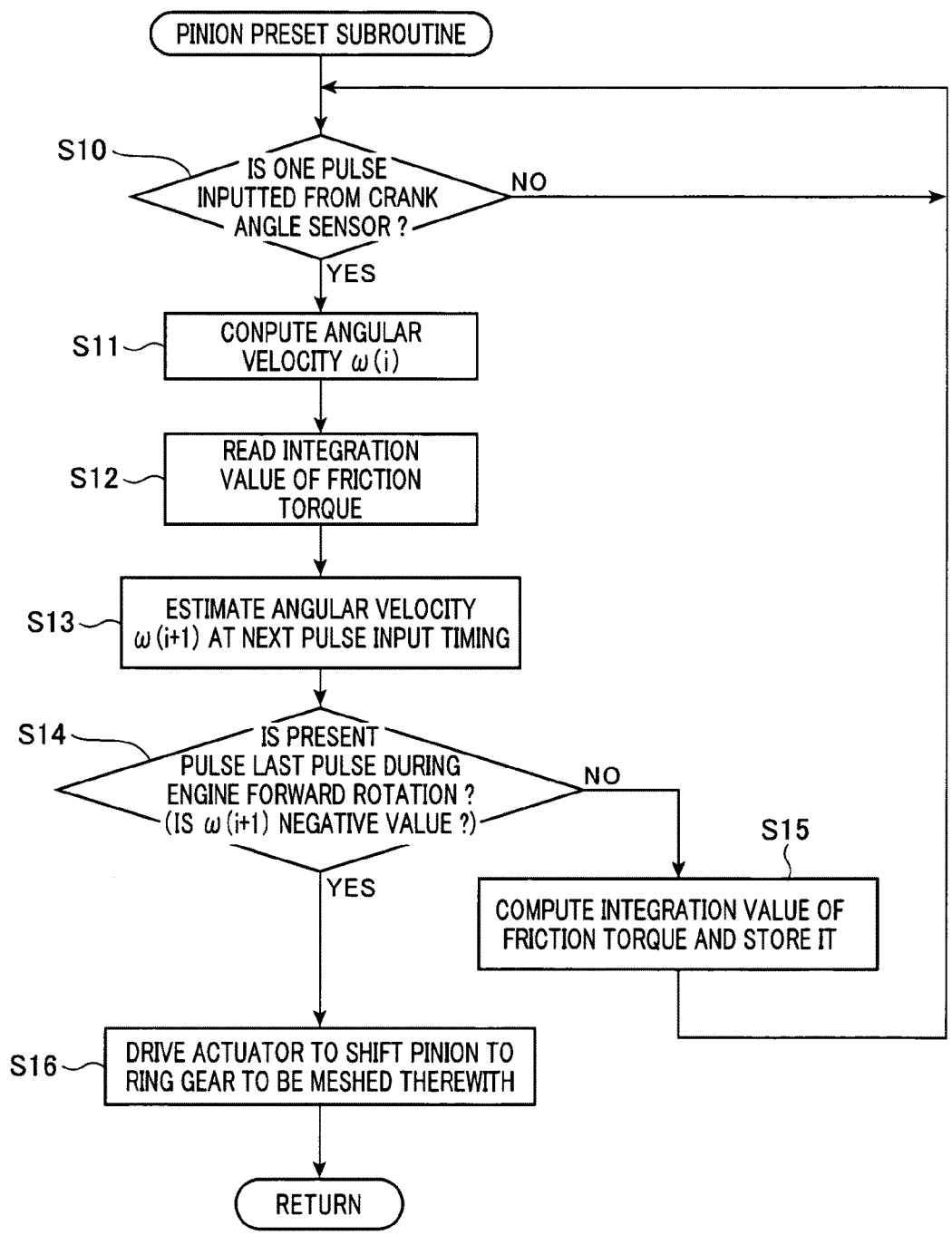
FIG. 5 is a flowchart schematically illustrating a pinion preset subroutine according to the first embodiment of the present invention.

Next, operations of the pinion-preset subroutine R2 to be executed by the ECU 20 will be described hereinafter with reference to FIGS. 4 and 5.

Launching the pinion-preset subroutine R2 when the operation is completed in step S2 or the determination in step S1 is affirmative, the ECU 20 determines whether one pulse of the NE signal outputted from the crank angle sensor 29 is inputted thereto in step S10.

Upon determining that one pulse of the NE signal is not inputted to the ECU 20 (NO in step S10 of FIG. 5), the ECU 20 repeats the determination in step S10.

Otherwise, upon determining that one pulse of the NE signal is inputted to the ECU 20 (YES in step S10), the ECU 20 proceeds to step S11. In other words, the ECU 20 proceeds to step S11 every time one pulse of the NE signal is inputted to the ECU 20. One pulse of the NE signal to be inputted to the ECU 20 will also be referred to as "i-th pulse (i=1, 2, . . . )" hereinafter.

In step S11, the ECU 20 computes (calculates) an angular velocity ω of the crankshaft 22 (engine 21) in accordance with the following equation every time one pulse of the NE signal is presently inputted to the ECU 20:

$$\omega[rad/sec] = \frac{R[deg]}{360 \times t[sec]} \times 2\pi \quad (1)$$

where R represents the crank-angle measurement resolution, in degrees, of the crank angle sensor 29, and t represents the pulse interval in the NE signal. The operation in step S11 serves as, for example, a calculator.

That is, the pulse interval t represents a time in seconds [sec] that has elapsed since the rising timing of the previous one pulse of the NE signal until the rising timing of one pulse of the NE signal presently inputted to the ECU 20.

Note that, after the stop of the burning of the air-fuel mixture within each cylinder, while the engine 21 (crankshaft 22) is rotated without the aid of the engine 21, the rotating behavior of the engine 21 is represented as a function of the engine friction torque T [Nm], the inertia J of the engine 21, and the angular velocity ω of the engine 21.

That is, after the stop of the burning of the air-fuel mixture within each cylinder, the engine 21 (crankshaft 22) is rotated by the torque of the inertia J of the engine 21 while the friction torque T is consumed from the torque based on the inertia J.

For this reason, when the angular velocity ω of the crankshaft 22 is changed from a present value ω(i) to the next value ω(i+1), the following relationship between the change in the rotating energy based on the inertia J and the energy based on the friction torque from a present value θ(i) of the crank angle to the next value θ(i+1) thereof is established in accordance with the energy conservation law:

$$\frac{1}{2}J(\omega_{(i)}^2 - \omega_{(i+1)}^2) = -\int_{\theta_{(i)}}^{\theta_{(i+1)}} T(\theta)d\theta \quad (2)$$

where:

the present value ω(i) of the angular velocity ω represents an actual value of the angular velocity ω when the i-th pulse of the NE signal is inputted to the ECU 20;

the next value ω(i+1) of the angular velocity represents an estimated value of the angular velocity ω when the next (i1)-th pulse of the NE signal will be inputted to the ECU 20;

the present value θ(i) of the crank angle corresponds to the input timing of the i-th pulse of the NE signal;

the next value θ(i+1) of the crank angle appears next to the preset value θ(i) thereof;

T(θ) represents the friction torque as the function of the crank angle θ; and $\int_{\theta_{(i)}}^{\theta_{(i+1)}} T(\theta)d\theta$ represents the energy based on the friction torque T(θ) when the crankshaft 22 is rotated from the present value θ(i) of the crank angle to the next value θ(i+1) thereof.

Note that "i" represents a value of any one of the parameters associated with the engine operations when one present pulse of the NE signal is inputted to the ECU 20.

Thus, the following equation (3) is established:

$$\int_{\theta_{(i)}}^{\theta_{(i+1)}} T(\theta)d\theta = \frac{1}{2}J(\omega_{(i+1)}^2 - \omega_{(i)}^2) \quad (3)$$

From the equation (3), the following equation (4) is derived:

$$\omega_{(i+1)} = \sqrt{\frac{2}{J}\int_{\theta_{(i)}}^{\theta_{(i+1)}} T(\theta)d\theta + \omega_{(i)}^2} \quad (4)$$

For example, the equation (4) has been described in the pinion-preset subroutine R2, or the equation (4) has been stored in the storage medium 20a and can be called by the pinion-preset subroutine R2 as a function.

Returning to the subroutine R2, after the operation in step S11, the ECU 20 reads the integration value of the friction torque T stored in the storage medium 20a in step S12. The integration value of the friction torque T has been computed to be stored in the storage medium 20a when the previous pulse ((i−1)-th pulse) is inputted to the ECU 20 in step S15 described later. That is, in the storage medium 20a, the integration value $\int_{\theta_{(i)}}^{\theta_{(i+1)}} T(\theta)d\theta$ of the friction torque corresponding to the (i−1)-th pulse has been stored.

Note that, when the first pulse (i=1) of the NE signal is inputted to the ECU 20 so that no integration values of the friction torque have been stored in the storage medium 20a, a default value, which has been previously prepared as the friction torque based on, for example, the map M1, and stored in the storage medium 20a, can be used as the integration value of the friction torque for the first pulse.

Next, the ECU 20 proceeds to step S13, and estimates the next value ω(i+1) of the angular velocity ω corresponding to the input timing of the next pulse ((i+1)-th pulse) in accordance with the equation (4) set forth above in step S13.

Specifically, in step S13, the ECU 20 substitutes the integration value $\int_{\theta_{(i)}}^{\theta_{(i+1)}} T(\theta)d\theta$ of the friction torque read in step S12 into the equation (4). Then, the ECU 20 computes the next value ω(i+1) of the angular velocity corresponding to the input timing of the next pulse ((i+1)-th pulse) in accordance with the equation (4).

Thereafter, the ECU 20 proceeds to step S14, and determines whether the estimated value ω(i+1) of the angular velocity at the input timing of the next (i+1)-th pulse is an imaginary number to thereby determine whether the present i-th pulse is the last pulse of the NE signal during the forward rotation of the engine 21 in step S14. In other words, the ECU 20 determines whether the estimated value ω(i+1) of the angular velocity at the input timing of the next (i+1)-th pulse is less than zero to thereby determine whether the present i-th pulse is the last pulse of the NE signal during the forward rotation of the engine 21 in step S14. The operations in steps S12 to S14 serve as, for example, a determiner.

Upon determining that the estimated value ω(i+1) of the angular velocity at the input timing of the next (i+1)-th pulse is not an imaginary number, in other words, is equal to or greater than zero (NO in step S 14), the ECU 20 determines that the present i-th pulse is not the last pulse of the NE signal during the forward rotation of the engine 21, proceeding to step S15.

That is, in step S14, upon determining that the estimated value ω (i+1) of the angular velocity at the input timing of the next (i+1)-th pulse is zero or a positive value, the ECU 20 determines that the present i-th pulse is not the last pulse of the NE signal during the forward rotation of the engine 21.

In step S15, the ECU 20 computes the integration value $\int_{\theta_{(i)}}^{\theta_{(i+1)}} T(\theta)d\theta$ of the friction torque in accordance with the equation (3), and stores the integration value $\int_{\theta_{(i)}}^{\theta_{(i+1)}} T(\theta)d\theta$ of the friction torque in the storage medium 20a, returning to step S10. Thereafter, the ECU 20 repeatedly carries out the operations in steps S10 to S15 until the determination in step S14 is affirmative.

Otherwise, upon determining that the estimated value ω(i+1) of the angular velocity at the input timing of the next (i+1)-th pulse is an imaginary number, in other words, is less than zero (YES in step S14), the ECU 20 determines that the present i-th pulse is the last pulse of the NE signal during the forward rotation of the engine 21, proceeding to step S16.

That is, in step S14, upon determining that the estimated value ω(i+1) of the angular velocity at the input timing of the next (i+1)-th pulse is a negative value, the ECU 20 determines that the present i-th pulse is the last pulse of the NE signal during the forward rotation of the engine 21.

In step S16, the ECU 20 sends the electric signal indicative of switch-on of the relay 19 to the relay 19. This turns on the relay 19 to thereby energize the solenoid 16 of the actuator 14. This shifts the pinion 13 toward the ring gear 23 so as to be meshed therewith. This completes the preset of pinion 13 to the ring gear 23. After the operation in step S16, the ECU 20 returns to the main routine R1. The operation in step S16, the relay 19, and the actuator 14 serve as a pinion engaging unit.

Note that the angular velocity ω of the crankshaft 22 (engine 21) can be easily converted to the engine speed Ne. That is, the ECU 20 can convert the present value ω(i) of the angular velocity to a present value Ne (i) of the engine speed, and convert the next estimated value ω(i+1) of the angular velocity to the next estimated value Ne(i+1) of the engine speed.

Thus, in step S13, the ECU 20 can estimate the next value Ne(i+1) of the engine speed, and determine whether the estimated value Ne(i+1) of the engine speed at the input timing of the next (i+1)-th pulse is an imaginary number (a negative value) to thereby determine whether the present i-th pulse is the last pulse of the NE signal during the forward rotation of the engine 21 in step S14.

As described above, every time one pulse of the NE signal is inputted to the ECU 20, the engine starting system 1 according to the first embodiment is designed to:

estimate a value of the angular velocity of the crankshaft 22 or a value of the engine speed at the input timing of the next pulse of the NE signal; and determine whether the estimated value of the angular velocity of the crankshaft 22 or the engine speed is an imaginary number (a negative value) to thereby determine whether the present pulse is the last pulse of the NE signal during the forward rotation of the engine 21.

When it is determined that the estimated value of the angular velocity of the crankshaft 22 or the engine speed is an imaginary number (a negative value) so that it is determined that the present pulse is the last pulse of the NE signal during the forward rotation of the engine 21, the engine starting system 1 is designed to drive the actuator 14 so that the pinion 13 is shifted to the ring gear 23 to be meshed therewith.

That is, the engine starting system 1 carries out the preset of the pinion 13 to the ring gear 23 at appropriate timing when the rotational direction of the engine 21 is the forward rotational direction with the engine speed being very close to zero.

Thus, it is possible for the engine starting system 1 to engage the pinion 13 with the ring gear 23 with low noise without requiring any sensor for detecting the reverse rotation of the engine 21. This achieves an advantage of carrying out the preset of the pinion 13 to the ring gear 23 at low cost, thus meeting low-cost requirements for vehicles as recent important technical requirements.

Additionally, because the engine starting system 1 makes the pinion 13 shift to the ring gear 23 at the input timing of the last pulse of the NE signal during the forward rotation of the engine 21, it is possible to reliably shift the pinion 13 to the ring gear 23 within a very low engine-speed range during the forward rotation of the engine 21. This reduces noise due to the shift of the pinion 13 to the ring gear 23 without using functions of driving the pinion 13 at a low current or low voltage like the conventional device or the conventional second system described in the BACKGROUND OF THE INVENTION of the specification.

These advantages set forth above make it possible to provide, at low cost, the engine starting system 1 capable of causing the pinion 13 to be meshed with the ring gear 23 at low noise immediately before the engine 21 is completely stopped or reversely rotated during the engine 21 coasting.

In addition, because the engine starting system 1 is designed to shift the pinion 13 to be engaged with the ring gear 23 before the rotation of the crankshaft 22 of the engine 21 is completely stopped. Thus, it is possible to prevent the restart of the engine 21 from being delayed while the advantages set forth above are maintained.

In step S15, the ECU 20 computes the integration value $\int_{\theta_{(i)}}^{\theta_{(i+1)}} T(\theta)d\theta$ of the friction torque in accordance with the equation (3), but can compute the integration value $\int_{\theta_{(i)}}^{\theta_{(i+1)}} T(\theta)d\theta$ in accordance with the map M1; this map M1 represents a function (relationship) between a variable of the crank angle of the engine 21, a variable of the temperature of the engine coolant, and a variable of engine friction torque T.

Note that, in the first embodiment, the cycle of estimating a value of the angular velocity of the crankshaft 22 or a value of the engine speed is set to the pulse-input interval, for example, 30 crank degrees, to the ECU 20 from the crank angle sensor 29, but the present invention is not limited thereto.

Specifically, each time the piston reaches the compression top dead center (TDC) in a corresponding cylinder, the engine starting system 1 can be designed to:

estimate a value of the angular velocity of the crankshaft 22 or a value of the engine speed at the next timing at which the piston reaches the TDC in a corresponding cylinder; and determine whether the estimated value of the angular velocity of the crankshaft 22 or the engine speed is a negative value to thereby determine whether the present pulse is the last pulse of the NE signal during the forward rotation of the engine 21.

When it is determined that the estimated value of the angular velocity of the crankshaft 22 or the engine speed is a negative value, the engine starting system 1 can determine that the piston does not pass the next TDC in a corresponding cylinder, thus determining that the present pulse is the last pulse of the NE signal during the forward rotation of the engine 21.

In the first embodiment, the ECU 20 carries out the operations in steps S11 to S15 to thereby determine whether the present pulse is the last pulse of the NE signal during the forward rotation of the engine 21. However, the present invention is not limited to the last-pulse determining method described in the operations in steps S11 to S15.

Figure 6A:
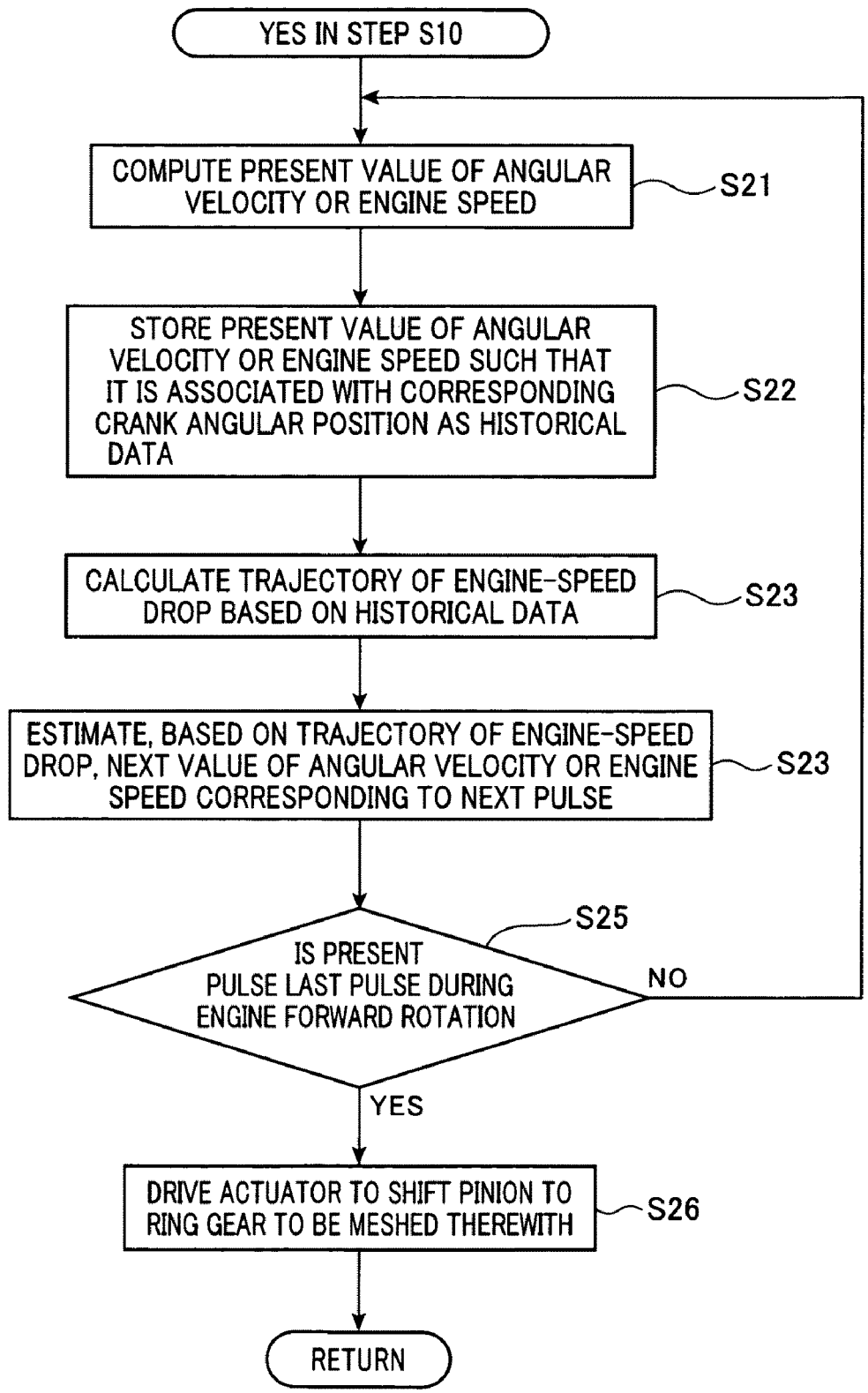
FIG. 6A is a flowchart schematically illustrating operations of the ECU according to a modification of the first embodiment.

Specifically, as a modification of the first embodiment, upon determining that one pulse (i-th pulse) of the NE signal is inputted to the ECU 20 (YES in step S10), the ECU 20 proceeds to step S21 of FIG. 6A.

In step S21, the ECU 20 calculates a present value of the angular velocity of the crankshaft 22 or a present value of the engine speed based on the pulse interval t that has elapsed since the rising timing of the previous (i−1) pulse of the NE signal until the rising timing of the present i-th pulse of the NE signal presently inputted to the ECU 20. The operation is identical to that in step S11.

In step S22, the ECU 20 stores the present value of the angular velocity of the crankshaft 22 or the engine speed in the storage medium 20a such that it is associated with a corresponding crank angular position (rotational position) of the crankshaft 22 as historical data.

In step S23, the ECU 20 calculates the trajectory of the engine-speed change (drop) based on the historical data associated with the corresponding crank angular position stored in the storage medium 20a.

In step S24, the ECU 20 estimates, based on the trajectory of the engine-speed change calculated in step S23, the next value of the angular velocity or the engine speed corresponding to the input timing of the next (i+1)-th pulse.

In step S25, the ECU 20 determines whether the estimated value of the angular velocity or the engine speed at the input timing of the next (i+1)-th pulse is a negative value to thereby determine whether the present i-th pulse is the last pulse of the NE signal during the forward rotation of the engine 21.

Upon determining that the estimated value of the angular velocity or the engine speed at the input timing of the next (i+1)-th pulse is not a negative value (NO in step S25), the ECU 20 determines that the present i-th pulse is not the last pulse of the NE signal during the forward rotation of the engine 21, returning to step S21. Thereafter, the ECU 20 repeatedly carries out the operations in steps S21 to S25 each time one pulse of the NE signal is inputted to the ECU 20 as the present pulse until the determination in step S25 is affirmative. Note that, because, by the repeatedly performed operations in steps S21 and S22, the historical data associated with each of the corresponding crank angular positions has been stored in the storage medium 20a, the ECU 20 calculates the trajectory of the engine-speed change based on the historical data associated with each of the corresponding crank angular positions stored in the storage medium 20a.

Otherwise, upon determining that the estimated value of the angular velocity or the engine speed at the input timing of the next (i+1)-th pulse is a negative value (YES in step S25), the ECU 20 determines that the present i-th pulse is the last pulse of the NE signal during the forward rotation of the engine 21, proceeding to step S26.

In step S26, the ECU 20 sends the electric signal indicative of switch-on of the relay 19 to the relay 19 as well as the operation in step S16.

This shifts the pinion 13 toward the ring gear 23 so as to be meshed therewith. This completes the preset of pinion 13 to the ring gear 23. After the operation in step S26, the ECU 20 returns to the main routine R1.

As described above, the engine starting system according to the modification of the first embodiment is designed to calculate the trajectory of the engine-speed change based on the historical data associated with each of the corresponding crank angular positions, and to estimate, based on the calculated trajectory of the engine-speed change, the next value of the angular velocity or the engine speed corresponding to the input timing of the next (i+1)-th pulse.

Thus, it is possible to reliably determine whether the present i-th pulse is the last pulse of the NE signal during the forward rotation of the engine 21.

In the first embodiment, in step S14, the ECU 20 determines whether the estimated value $\omega(i+1)$ of the angular velocity at the input timing of the next (i+1)-th pulse is an imaginary number to thereby determine whether the present i-th pulse is the last pulse of the NE signal during the forward rotation of the engine 21 in step S14. The present invention is however not limited to the operation.

Figure 6B:
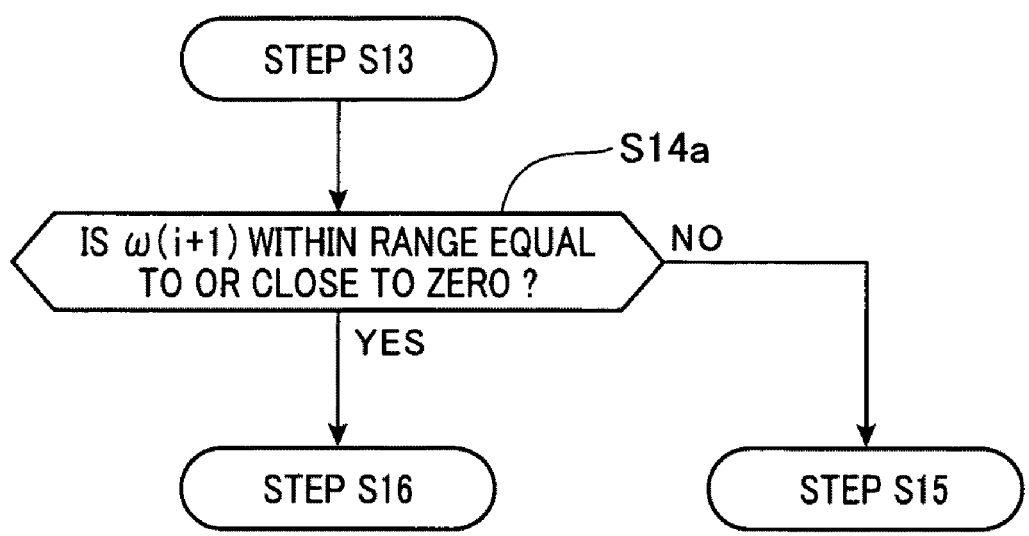
FIG. 6B is a flowchart schematically illustrating operations of the ECU according to another modification of the first embodiment.

Specifically, in step S14a of FIG. 6B in place of step S14, the ECU 20 determines whether the estimated value $\omega(i+1)$ of the angular velocity at the input timing of the next (i+1)-th pulse is within a range corresponding to a positive engine-speed range equal to or close to zero, such as 0 to 100 RPM.

When it is determined that the estimated value $\omega(i+1)$ of the angular velocity at the input timing of the next (i+1)-th pulse is out of the range corresponding to the positive engine-speed range (NO in step 14a), the ECU 20 proceeds to step S15.

Otherwise, when it is determined that the estimated value $\omega(i+1)$ of the angular velocity at the input timing of the next (i+1)-th pulse is within the range corresponding to the positive engine-speed range equal to or close to zero, such as 0 to 100 RPM (YES in step S14a), the ECU 20 determines that the engagement of the pinion 13 with the ring gear 23 in synchronization with the present i-th pulse keeps, at a low level, noise due to the engagement of the pinion 13 with the ring gear 23. Then the ECU 20 shifts to step S16.

Thus, the other modification set forth above achieves the same advantages as those achieved by the first embodiment.

Second Embodiment

An engine starting system for the engine 21 installed in a vehicle according to the second embodiment of the present invention will be described hereinafter with reference to FIGS. 7 and 8.

The hardware and software structures of the engine starting system according to the second embodiment are substantially identical to those of the engine starting system 1 according to the first embodiment except for the following points. So, like parts between the engine starting systems according to the first and second embodiments, to which like reference characters are assigned, are omitted or simplified in description.

As described above, it is preferable to restart, as soon as possible, the engine 21 after the automatic stop control of the engine 21 has been carried out. In addition, if loud noise produced when the pinion 13 is meshed with the ring gear 23, this would be irritating and unpleasant for the occupant(s).

Thus, like the first embodiment, in order to immediately restart the engine 21 with noise caused when the pinion 13 is engaged with the ring gear 23 being reduced, the engine starting system according to the second embodiment is designed to carry out the preset of the pinion 13 to the ring gear 23 during the engine 21 coasting.

As well as the first embodiment, in order to reduce noise caused when the pinion 13 is engaged with the ring gear 23 as low as possible, it is necessary to engage the pinion 13 with the ring gear 23 immediately before the stop of the engine coasting, and specifically, it is necessary to engage the pinion 13 with the ring gear 23 within a very low relative rotational speed between the pinion 13 and ring gear 23, such as 0±100 RPM. More specifically, when the preset of the pinion 13 to the ring gear 23 is synchronized with the engine speed being zero, this provides a great advantage of reducing noise due to the pinion preset.

On the other hand, as described above, a normal magnetic-pickup type sensor used for the crank angle sensor 29 has limitations of the engine speed for outputting the NE signal, and therefore, the crank angle sensor 29 may not measure, with high accuracy, the engine speed when the engine speed is within a very low-speed range; this very low-speed range is, for example, equal to or lower than a range of 200 to 300 RPM.

This is because, during the engine speed being within the very low-speed range, the pickup 35 of the crank angel sensor 29 may not detect the passing of one tooth 36 of the rotating reluctor disc 34 in front thereof, in other words, the rotation of each tooth 36 may not readily change a previously formed magnetic field.

However, as described above, the lower the engine speed is, the more noise due to the engagement of the pinion 13 with the ring gear 23 is reduced. For this reason, a proper engine-speed range within which noise due to the engagement of the pinion 13 with the ring gear 23 can be effectively reduced is included in such a very low-speed range; values of the engine speed within this very low-speed range may not be calculated by the crank angle sensor 29 with high accuracy.

Thus, it may be difficult to determine a proper timing at which the pinion 13 is shifted to be meshed with the ring gear 23, resulting in that noise due to the engagement of the pinion 13 with the ring gear 23 may be increased.

In order to address the aforementioned circumstances, the engine starting system according to the second embodiment is designed to estimate, based on the engine speed calculated according to the NE signal, the trajectory of the engine-speed change during the engine coasting after the automatic stop control of the engine 21 has been carried out. The engine starting system is also designed to adjust, based on the estimated trajectory of the engine-speed change, the timing of the pinion 13 being engaged with the ring gear 23.

As a specific example of the estimation of the trajectory of the engine-speed change, the engine starting system is designed to calculate an instantaneous engine speed based on the NE signal, and to estimate the trajectory of the engine-speed change based on values of the instantaneous engine speed; these values of the instantaneous engine speed are within a decreasing period of the instantaneous engine speed.

Note that the instantaneous engine speed means a value calculated based on the pulse interval of the NE signal each time the crankshaft 22 is rotated by a preset crank angle of, for example, 30 degrees. As described above, the pulse interval of the NE signal represents a time in seconds [sec] that has elapsed since the rising timing of the previous one pulse of the NE signal until the rising timing of one pulse of the NE signal presently inputted to the ECU 20.

In other words, the instantaneous engine speed is equivalent to the angular velocity $\omega$ of the crankshaft 22.

Next, how to adjust the timing of the pinion 13 being engaged with the ring gear 23 will be fully described hereinafter with reference to FIG. 7 corresponding to FIG. 4 of the first embodiment.

Figure 7:
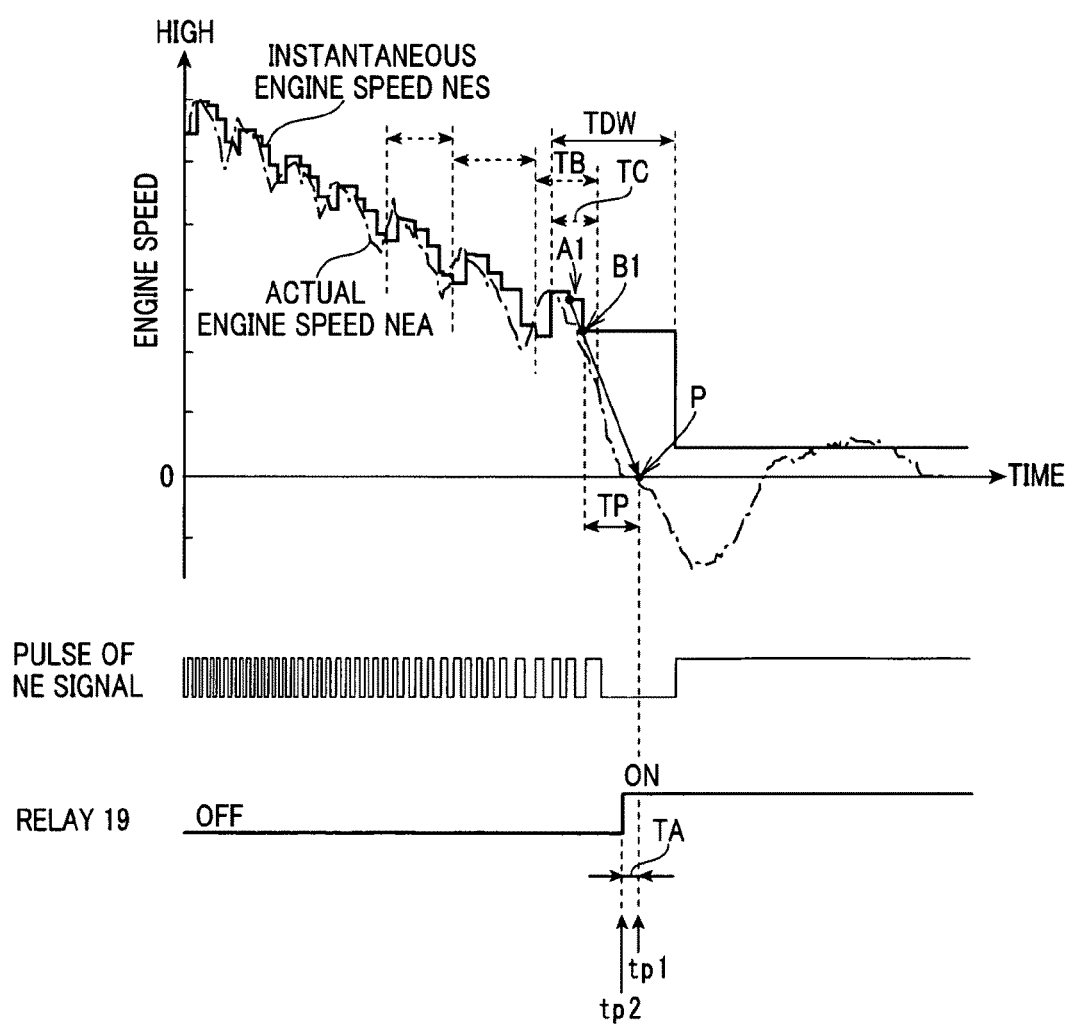
FIG. 7 is a timing chart schematically illustrating a relationship between the behavior of an engine speed and pulses of an NE signal outputted from a crank angle sensor illustrated in FIG. 2 according to the second embodiment of the present invention.
Figure 8:
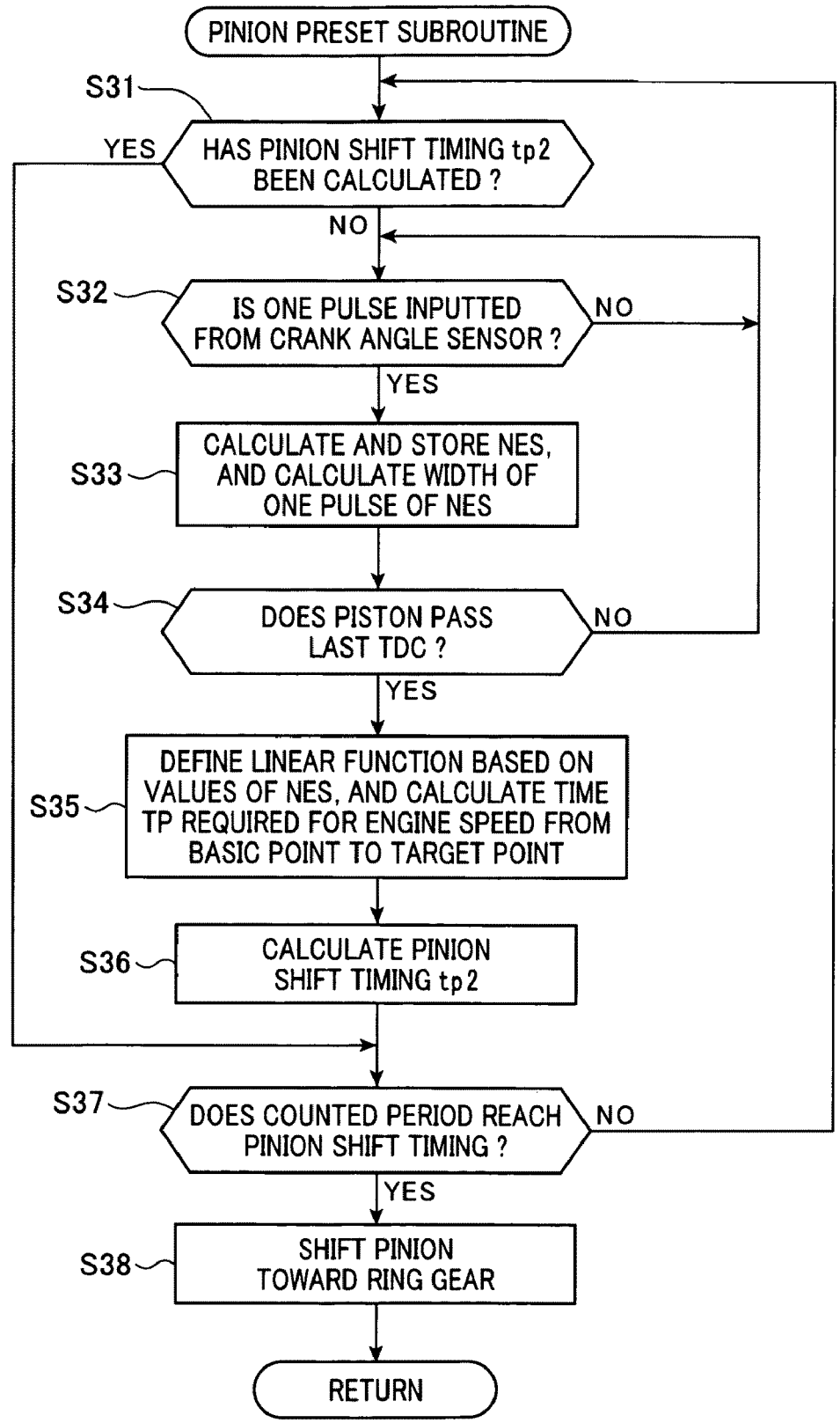
FIG. 8 is a flowchart schematically illustrating a pinion preset subroutine according to the second embodiment of the present invention.

FIG. 7 is a timing chart schematically illustrating the change in the actual engine speed (actual engine speed NEA) and the change in the instantaneous engine speed NES; the actual engine speed NEA is illustrated in FIG. 7 by a long dashed short dashed line, and the instantaneous engine speed NES is illustrated in FIG. 7 by a solid line.

As described in the first embodiment, the stop of the burning of the air-fuel mixture in each cylinder according to the automatic stop control of the engine 21 causes the engine 21 to coast so that the actual engine speed NEA gradually drops. While gradually dropping, the actual engine speed NEA fluctuates alternately up and down each time the piston reaches the TDC in a corresponding cylinder (see FIG. 7).

In addition, as illustrated by the solid line in FIG. 7, the instantaneous engine speed NES changes with change in the actual engine speed NEA. Specifically, in FIG. 7, a preset period corresponding to a crank angle of 180 degrees including the timing when the piston reaches the TDC of a corresponding cylinder is represented as "TB". In each period TB, the instantaneous engine speed NES fluctuates down, up, and down (see FIG. 7).

When the waveform of the fluctuations of the instantaneous engine speed NES in each period TB is represented as "unit waveform TBW", the unit waveform TBW repeatedly appears during the actual engine speed NEA gradually dropping.

The engine starting system according to the second embodiment utilizes the features of the change in the instantaneous engine speed NES to thereby carry out a pinion preset subroutine.

Specifically, the engine starting system according to the second embodiment is designed to calculate a plurality of values of the instantaneous engine speed NES within a region TC in at least one period TB; the instantaneous engine speed NES drops stepwise within the region TC. Then, the engine starting system is designed to estimate, based on the plurality of values of the instantaneous engine speed NES, the trajectory of the change in the engine speed during the engine 21 coasting after the calculation timing of the plurality of values of the instantaneous engine speed NES.

For example, as illustrated in FIG. 7, the engine starting system is designed to calculate first and second values of the instantaneous engine speed NES at respective first and second timings A1 and B1 within the region TC in one period TB; the first and second timings A1 and B1 appear immediately after the piston passes the TDC in a corresponding cylinder.

Then, the engine starting system is designed to define a linear function passing through the first and second values of the instantaneous engine speed NES, and to estimate, based on the linear function, the downward trajectory (change) of the engine speed.

Next, the engine starting system is designed to set one of the plurality of values of the instantaneous engine speed NES, such as the second value B1 in FIG. 2, to a basic point. In addition, the engine starting system is designed to obtain a target point P on the linear function; this target point P corresponds to a preset target engine speed NEP, such as zero, for the engagement of the pinion 13 with the ring gear 23. Then, the engine starting system is designed to calculate a time TP required for the engine speed to transit from the basic point (second value B1) to the target point P based on the linear function.

Thereafter, the engine starting system is designed to carry out control of the shift of the pinion 13 to the ring gear 23 so that the pinion 13 is engaged with the ring gear 23 at a pinion engagement timing tp1 when the required time TP has elapsed since the basic point (second value B1).

Note that, when predicting the trajectory of the engine speed based on the linear function, the engine starting system can be designed to use at least two of the plurality of values of the instantaneous engine speed NES; these at least two of the plurality of values are temporally adjacent to each other (see the first and second values in FIG. 7). When predicting the trajectory of the engine speed based on the linear function, the engine starting system can be designed to use at least two of the plurality of values of the instantaneous engine speed NES; these at least two of the plurality of values are temporally nonadjacent to each other.

In the second embodiment, the preset target engine speed NEP is defined as an engine speed at the start of the engagement of the pinion 13 with the ring gear 23, but can be defined as an engine speed at the completion of the engagement of the pinion 13 with the ring gear 23.

In the second embodiment, the engine starting system is designed to carry out the pinion preset subroutine when the instantaneous engine speed NES reaches the start of a monotone decreasing period TDW within which the instantaneous engine speed NES monotonously decreases toward zero.

In the second embodiment, the start of the monotone decreasing period TDW is defined as the timing at which the piston reaches the last TDC in a corresponding cylinder during the forward rotation of the engine 21 before the transition of the engine speed from the forward direction to the reverse direction. In other words, the engine starting system is preferably designed to calculate a plurality of values of the instantaneous engine speed NES on the unit waveform TBW in one period TB within which the last TDC appears.

The reason why the engine starting system is designed to calculate a plurality of values of the instantaneous engine speed NES on the unit waveform TBW in one period TB within which the last TDC appears is that:

after the appearance of the last TDC during the forward rotation of the engine 21, because the engine speed monotonously decreases, the trajectory of the engine-speed change can be more accurately calculated.

That is, before the appearance of the last TDC during the forward rotation of the engine 21, the instantaneous engine speed NES is increased when reaching the next TDC. This may cause a gap between the trajectory of the actual engine speed and the estimated trajectory of the engine speed.

In contrast, after the appearance of the last MC during the forward rotation of the engine 21, the instantaneous engine speed NES is monotonously reduced. For this reason, using a plurality of values of the instantaneous engine speed NES on the unit waveform TBW in one period TB within which the last TDC appears in order to estimate the trajectory of the instantaneous engine speed NES allows the gap between the trajectory of the actual engine speed and the estimated trajectory of the engine speed to be reduced as low as possible.

In the second embodiment, in order to adjust the timing of engaging the pinion 13 with the ring gear 23, the engine starting system is designed to adjust a pinion shift timing tp2 of shifting the pinion 13 to the ring gear 23 to thereby adjust the pinion engagement timing tp1. Specifically, it takes time until the pinion 13 has been engaged with the ring gear 23 since the start of the shift of the pinion 13 to the ring gear 23. Thus, as illustrated in FIG. 7, the engine starting system is designed to adjust the pinion shift timing tp2 so that the shift of the pinion 13 to the ring gear 23 is started at a time earlier than the pinion engagement timing tp1 by a shifting time TA; this shifting time TA is required from the start of the shift of the pinion 13 to the ring gear 23 to the start or completion of the engagement of the pinion 13 with the ring gear 23.

Next, specific operations of a pinion-preset subroutine R2 to be executed by the ECU 20 according to the second embodiment will be described hereinafter with reference to FIGS. 7 and 8.

Launching the pinion-preset subroutine R2 when the operation is completed in step S2 or the determination in step S1 is affirmative, the ECU 20 determines whether the pinion shift timing tp2 has been calculated (stored) in step S31.

Upon determining that the pinion shift timing tp2 has not been calculated (NO in step S31), the ECU 20 proceeds to step S32, and determines whether one pulse of the NE signal outputted from the crank angle sensor 29 is inputted thereto in step S32.

Upon determining that one pulse of the NE signal is not inputted to the ECU 20 (NO in step S32), the ECU 20 repeats the determination in step S32.

Otherwise, upon determining that one pulse of the NE signal is inputted to the ECU 20 (YES in step S32), the ECU 20 proceeds to step S33. In other words, the ECU 20 proceeds to step S33 every time one pulse of the NE signal is inputted to the ECU 20. One pulse of the NE signal to be inputted to the ECU 20 will also be referred to as "i-th pulse (i=1, 2, ... )" hereinafter.

In step S33, the ECU 20 computes (calculates) a value of the instantaneous engine speed NES using the pulse interval t set forth above, and stores the value of the instantaneous engine speed NES in the storage medium 20a.

For example, the ECU 20 calculates a present value of the instantaneous engine speed NES in accordance with the equation (1) described in the first embodiment, and stores it in the storage medium 20a.

In step S33, the ECU 20 also calculates a value of the width of one pulse of the NE signal to be inputted thereto, and stores it in the storage medium 20a. The operations in steps S32 and S33 serve as an engine-speed calculator.

Next, the ECU 20 determines whether the instantaneous engine speed NES is within the monotone decreasing period TDW in step S34.

Specifically, in step S34, the ECU 20 determines whether the piston passes the last TDC in a corresponding cylinder during the forward rotation of the engine 21 before the transition of the engine speed from the forward direction to the reverse direction.

For example, in the second embodiment, when the present value of the instantaneous engine speed NES calculated in step S33 is equal to or lower than a preset threshold range of, for example, 200 to 300 RPM, and the difference of the value of the width of the previous pulse ((i−1)-th pulse) from the value of the width of one present pulse (i-th pulse) is equal to or lower than a preset threshold value, the ECU 20 determines that the piston passes the last TDC in a corresponding cylinder during the forward rotation of the engine 21 before the transition of the engine speed from the forward direction to the reverse direction.

Specifically, when it is determined that the piston does not pass the last TDC in a corresponding cylinder during the forward rotation of the engine 21 before the transition of the engine speed from the forward direction to the reverse direction (NO in step S34), the ECU 20 repeats the operations in steps S32 to S34.

The repeat of the operations in step S32 and S33 allows a plurality of values of the instantaneous engine speed NES to be stored in the storage medium 20a.

Otherwise, upon determining that the piston passes the last TDC in a corresponding cylinder during the forward rotation of the engine 21 before the transition of the engine speed from the forward direction to the reverse direction (YES in step S34), the ECU 20 proceeds to step S35.

In step S35, the ECU 20 computes (calculates) a plurality of values of the instantaneous engine speed NES using the pulse interval t set forth above; these plurality of values of the instantaneous engine speed NES are within the region TC in one period TB within which the last TDC appears (see FIG. 7).

In the second embodiment, for example, as described above, the ECU 20 computes (calculates) temporally adjacent first and second values of the instantaneous engine speed NES using the pulse interval t set forth above; these temporally adjacent first and second values of the instantaneous engine speed NES correspond to respective first and second timings A1 and B1 within the region TC in one period TB within which the last TDC appears (see FIG. 7).

In step S35, the ECU 20 defines, as the trajectory of the change in the engine speed, a linear function having a gradient and passing through the plurality of values of the instantaneous engine speed NES, and sets one of the plurality of values of the instantaneous engine speed NES to a basic point; this one of the plurality of values of the instantaneous engine speed NES is the lowest in the plurality of values of the instantaneous engine speed NES. In the second embodiment, the second value B1 in FIG. 2 is set to the basic point.

In step S35, the ECU 20 counts the period of time that has elapsed since the point of time when the instantaneous engine speed NES reaches the basic point (the second value B1).

In step S35, the ECU 20 obtains a target point P on the linear function; this target point P corresponds to a preset target engine speed NEP for the engagement of the pinion 13 with the ring gear 23. In the second embodiment, as the target engine speed, zero is set.

In step S35, the ECU 20 calculates a time TP required for the engine speed to transit from the basic point (second value B1) to the target point P based on the linear function. The operations in steps S34 and S35 serve as, for example, an estimator.

In step S36, the ECU 20 calculates the pinion shift timing tp2 based on the calculated time TP. Specifically, in step S36, the ECU 20 subtracts the shifting time TA from the calculated time TP; this shifting time TA is required from the start of the shift of the pinion 13 to the ring gear 23 to the start or completion of the engagement of the pinion 13 with the ring gear 23. Then, in step S36, the ECU 20 determines the pinion shift timing tp2 so that the pinion shift timing tp2 is later than the timing of the basic point by the result of the subtraction (TP−TA).

In step S37, the ECU 20 determines whether the counted period of time in step S35 reaches the pinion shift timing tp2. When it is determined that the counted period of time does not reach the pinion shift timing tp2 (NO in step S37), the ECU 20 repeats the determinations in steps S31 and S37 while counting the period of time in step S35.

Otherwise, when it is determined that the counted period of time reaches the pinion shift timing tp2 (YES in step S35), the ECU 20 proceeds to step S38, and sends the electric signal indicative of switch-on of the relay 19 to the relay 19 in step S38. This turns on the relay 19 to thereby energize the solenoid 16 of the actuator 14. This shifts the pinion 13 toward the ring gear 23 so as to be meshed therewith. This completes the preset of the pinion 13 to the ring gear 23. After the operation in step S38, the ECU 20 returns to the main routine R1 in the same manner as the first embodiment. The operations in steps S36 to S38, the relay 19, and the actuator 14 serve as, for example, a controller.

As described above, the engine starting system according to the second embodiment achieves the following advantages.

The engine starting system is configured to estimate the engine speed based on the NE signal obtained by the crank angle sensor 29, and adjust the timing of the pinion 13 being engaged with the ring gear 23 at a desired engine speed within the estimated engine speed region. This configuration carries out the engagement of the pinion 13 with the ring gear 23 at a proper timing, thus achieves the first advantage of reducing noise due to the engagement of the pinion 13 with the ring gear 23.

The engine starting system is configured to estimate the trajectory of the engine-speed change (drop) based on a plurality of values of the instantaneous engine speed NES within a region TC during which the instantaneous engine speed NES gradually drops. This configuration achieves the second advantage of estimating the gradient of the engine speed toward zero, that is, the trajectory of the engine speed change toward zero.

When the instantaneous engine speed NES reaches the start of the monotone decreasing period TDW, the engine starting system is configured to estimate a plurality of values of the instantaneous engine speed NES during the instantaneous engine speed NES being within the monotone decreasing period TDW. This configuration achieves the third advantage of making it possible to accurately estimate the trajectory of the engine-speed change when the instantaneous engine speed NES is close to zero.

A normal magnetic-pickup sensor used for the crank angle sensor 29 has limitations of the engine speed for outputting the NE signal, and therefore, the crank angle sensor 29 may not measure, with high accuracy, the engine speed when the engine speed is within a very low-speed range; this very low-speed range is, for example, equal to or lower than a range of 200 to 300 RPM.

However, the engine starting system according to the second embodiment is configured to estimate the engine speed when the engine speed is within such a very low-speed range. This configuration achieves the fourth advantage of performing the engagement of the pinion 13 with the ring gear 23 at a proper timing even if the engine speed is within such a very low-speed range.

The engine starting system is configured to estimate the timing at which the actual engine speed becomes zero, and carry out the engagement of the pinion 13 with the ring gear 23 at the estimated timing or thereabout. This configuration achieves the fifth advantage of more reducing noise due to the engagement of the pinion 13 with the ring gear 23. More specifically, the engine starting system is configured to estimate the timing at which the actual engine speed becomes zero at first during the engine coasting after the automatic stop control of the engine 21. This results in that the pinion 13 is engaged with the ring gear 23 as early as possible while reducing noise due to the engagement, thus reliably completing the engagement of the pinion 13 with the ring gear 23 before at least one of engine restart conditions is met.

The engine starting system is configured to determine the pinion shift timing tp2 based on the estimated trajectory of the engine-speed change and the shifting time TA required from the start of the shift of the pinion 13 to the ring gear 23 to the start or completion of the engagement of the pinion 13 with the ring gear 23. This configuration achieves the sixth advantage of more properly determining the engagement timing of the pinion 13 with the ring gear 23.

As the first modification of the second embodiment, the engine starting system can be configured to define a quadratic function passing through at least three or more values of the instantaneous engine speed NES; these at least three values of the instantaneous engine speed NES include a value of the instantaneous engine speed NES at the TDC; this value is located between the temporally first and last values. The engine starting system can also be configured to estimate, based on the quadratic function, the trajectory of the change in the engine speed during the engine 21 coasting after the calculation timing of the at least three values of the instantaneous engine speed NES.

For example, the engine starting system can be designed to calculate a time TP required for the engine speed to transit from a basic point, for example, the last value, to the target point P based on a tangential line of the quadratic function at the basic point; this tangential line passes through the target point P.

This configuration can more reduce the difference between the trajectory of the engine-speed change and that of the actual engine speed NEA.

As the second modification of the second embodiment, the engine starting system can be configured to estimate, based on a plurality of values of the instantaneous engine speed NES within at least two periods TB, the trajectory of the change in the engine speed during the engine 21 coasting after the calculation timing of the at least three values of the instantaneous engine speed NES. Specifically, the engine starting system can be configured to estimate, based on at least three values of the instantaneous engine speed within at least two temporally adjacent periods TB, the trajectory of the change in the engine speed.

As the third modification of the second embodiment, the engine starting system can be configured to estimate the trajectory of the change in the engine speed based on a plurality of values of the instantaneous engine speed NES; these values are located just before the very low-speed range set forth above.

That is, as described above, a normal magnetic-pickup sensor used for the crank angle sensor 29 has limitations of the engine speed for outputting the NE signal, and therefore, the crank angle sensor 29 may not measure, with high accuracy, the engine speed when the engine speed is within the very low-speed range.

At that time, the configuration of the engine starting system according to the third modification can estimate the trajectory of the engine speed based on a plurality of values of the instantaneous engine speed NES; these values are selected to be just before the very low-speed range. Specifically, the ECU 20 of the engine starting system can be configured to determine the limitations of the engine speed of the crank angle sensor 29 based on whether the width of one pulse to be inputted thereto is longer than a preset value to thereby determine the very low-speed range based on the determined limitations.

Figure 10:
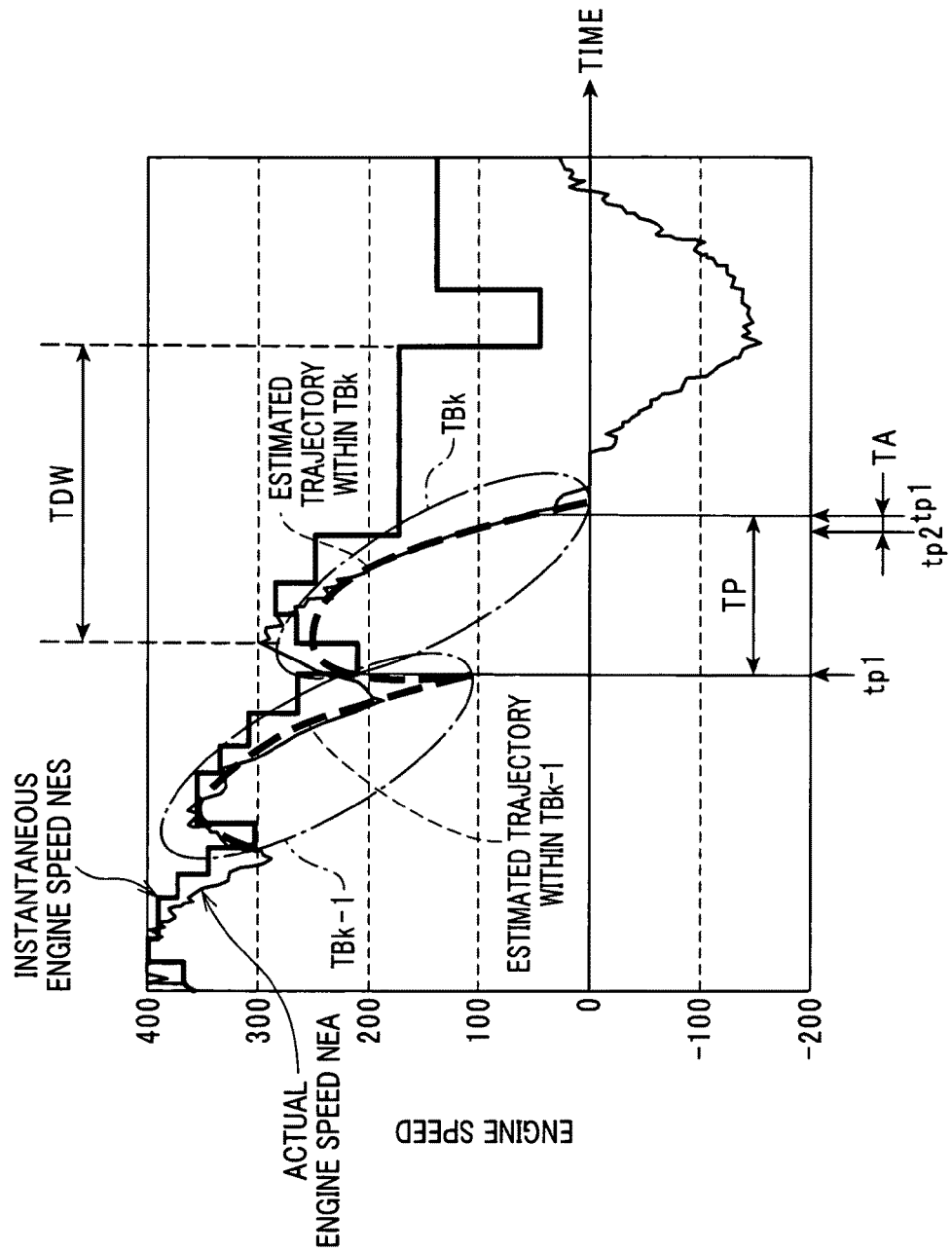
FIG. 10 is a timing chart schematically illustrating a relationship between the behavior of an engine speed and pulses of an NE signal outputted from a crank angle sensor illustrated in FIG. 2 according to the fourth modification of the second embodiment.

In the second embodiment, the engine starting system is designed to estimate the trajectory of the engine-speed change based on the instantaneous engine speed NES after the appearance of the last TDC, and calculate the pinion shift timing tp2 based on the estimated trajectory of the engine-speed change. The present invention is however not limited to the design (see FIG. 10).

Specifically, the engine starting system according to the fourth modification can be designed to:

estimate, for each of the periods TB (TBk−1, TBk) during the engine speed being equal to or lower than a preset value, such as several hundred RPM, the trajectory of the engine-speed change based on a plurality of values of the instantaneous engine speed NES within a corresponding one of the periods TB assuming that the trajectory of the engine-speed change monotonously decreases within each of the periods TB; and calculate the pinion shifting timing tp2 or the pinion engagement timing tp1 based on the estimated trajectory of the engine-speed change for each of the periods TB.

This design updates the previous pinion shifting timing tp2 for the previous period TB (TBk−1) to the newly calculated pinion shifting timing tp2 for the period TB (TBk) next to the previous period TB.

The engine starting system according to the fifth modification of the second embodiment can be designed to correct the estimated trajectory of the engine-speed change in step S35 according to the operating conditions of the engine 21 or those of the accessories 65. Specifically, the trajectory of the engine-speed change during the engine 21 coasting depends on the change in the operating conditions of the engine 21 or those of the accessories 65.

For example, the more the temperature information measured by the temperature sensors 27 is shifted to the lower temperature region, the more the friction between the outer surface of the piston and each cylinder. This may cause the degree of the engine-speed drop to be reduced. In addition, the more the compression load of each cylinder is increased, such as the closer the throttle position is toward the full-open position, the more the degree of the engine-speed drop is increased.

Moreover, when the air conditioner of the accessories 65 is in on state, the degree of the engine-speed drop is more increased as compared with when the air conditioner is in off state. Thus, in step S35, the ECU 20 can adjust (correct) the trajectory of the engine-speed change based on the operating conditions of the engine 21 and/or those of the accessories 65. This achieves an advantage of further reducing the gap between the estimated trajectory of the engine-speed drop and that of the trajectory of the actual engine-speed drop.

The engine starting system according to the sixth modification of the second embodiment can be designed to calculate a function indicative of the relationship between the engine speed and time within a period (previous period) TB previous to the monotonous decreasing period TDW (or one TB containing the last TDC); this function has one point (reference point) on the previous period TB as the start point thereof. For example, a point of the start of the previous period TB can be set to the reference point.

The engine starting system can also be designed to shift the function so as to adapt the function to the instantaneous engine speed NES within the one period TB containing the last TDC. For example, the engine starting system can be designed to shift the function such that a point, which corresponds to the reference point, on the instantaneous engine speed NES within the one period TB containing the last TDC is in agreement with the reference point of the function.

Then, the engine starting system can be designed to calculate a time TPa required for the engine speed to transit from a basic point on the shifted function to a target point Pa on the shifted function; this target point Pa corresponds to a preset target engine speed NEP.

Thus, the engine starting system can be designed to carry out control of the shift of the pinion 13 to the ring gear 23 so that the pinion 13 is engaged with the ring gear 23 at a pinion engagement timing tp1 when the required time TPa has elapsed since the basic point Pa.

Figure 11:
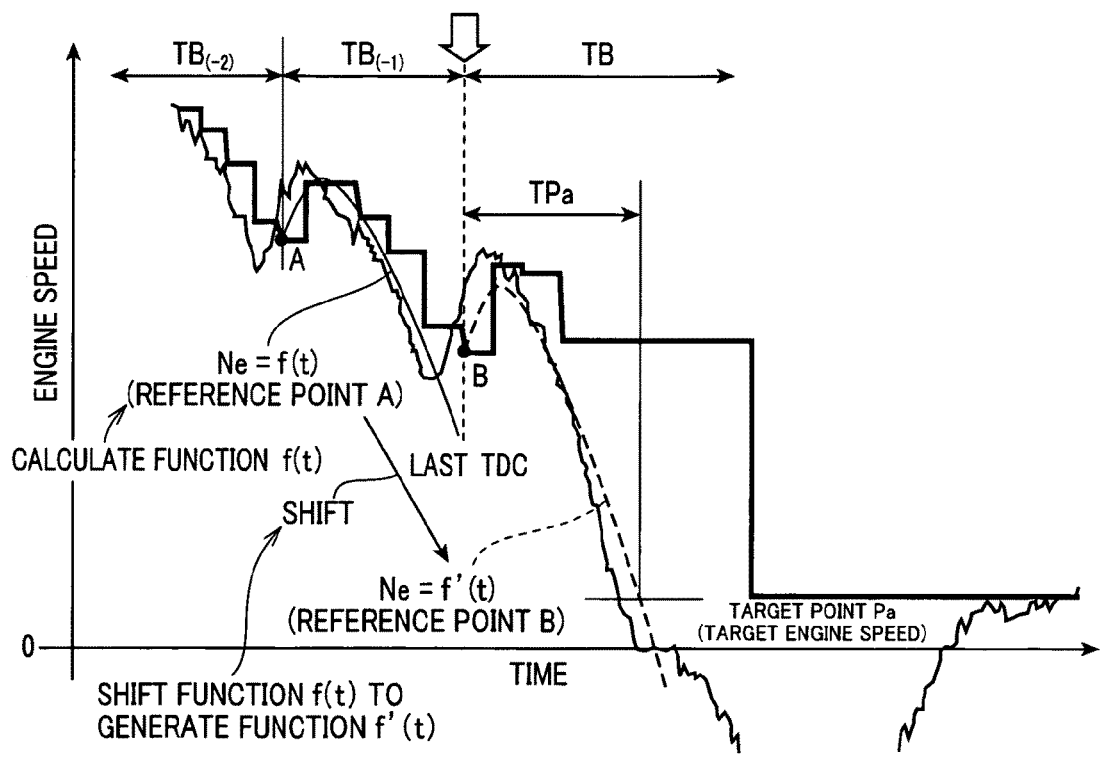
FIG. 11 is a timing chart schematically illustrating a relationship between the behavior of an engine speed and pulses of an NE signal outputted from a crank angle sensor illustrated in FIG. 2 according to the sixth modification of the second embodiment.

For example, in FIG. 11, a quadratic function, which represents the relationship between the engine speed and time within a period (previous period) $TB_{(-1)}$ previous to the monotonous decreasing period TDW (or one TB containing the last TDC) and has one point (reference point) A on the previous period $TB_{(-1)}$ as the start point thereof, is obtained as a quadratic function Ne=f(t) passing through a plurality of points containing the reference point A on the instantaneous engine speed NES within the previous period $TB_{(-1)}$.

The ECU 20 shifts the function Ne=f(t) such that a point B, which corresponds to the reference point A, on the instantaneous engine speed NES within the one period TB containing the last TDC is in agreement with the reference point A of the function Ne=f(t). The shifted function will be referred to as Ne=f(t)

Thereafter, the ECU 20 calculates a time TPa required for the engine speed to transit from a basic point, such as the point B, on the shifted function Ne=f(t) to a target point Pa on the shifted function Ne=f(t); this target point Pa corresponds to a preset target engine speed NEP.

Thus, the ECU 20 carries out control of the shift of the pinion 13 to the ring gear 23 so that the pinion 13 is engaged with the ring gear 23 at a pinion engagement timing tp1 when the required time TPa has elapsed since the basic point Pa.

The engine starting system according to the seventh modification can be configured to:

store, in the storage medium 20a, the trajectory of the engine-speed change that was previously estimated in step S35 based on a plurality of values of the instantaneous engine speed NES during the engine 21 coasting after the automatic stop control of the engine 21.

Thereafter, when carrying out the pinion preset subroutine, the ECU 20 can be programmed to read the previously estimated trajectory of the engine-speed change stored in the storage medium 20a; and adjust the timing of the pinion 13 being shifted toward the ring gear 23 based on the previously estimated trajectory of the engine-speed change stored in the storage medium 20a to thereby adjust the timing of the pinion 13 being engaged with the ring gear 23.

This configuration achieves an advantage of eliminating the estimation of the engine-speed change each time the engine stop-and-start control routine R1 is launched.

Figure 9A:
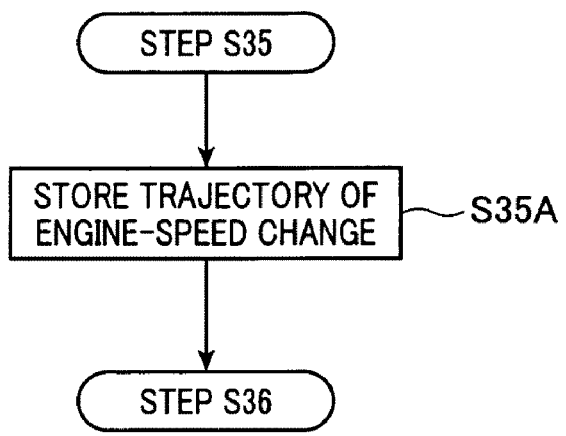
FIG. 9A is a flowchart schematically illustrating a first pinion preset subroutine as a modification of the pinion preset subroutine illustrated in FIG. 8 according to the seventh modification of the second embodiment.

For example, the engine starting system according to the seventh modification can be programmed to store, in the storage medium 20a, the trajectory of the engine-speed change, such as the gradient of the linear function or quadratic function, estimated based on a plurality of values of the instantaneous engine speed NES during the engine 21 coasting in step S35A of FIG. 9A; this trajectory of the engine-speed change is stored in the storage medium 20a to be associated with the corresponding operating conditions of the engine 20 and/or the accessories 65 measured at the time of the estimation of the trajectory by the sensors 65.

That is, a plurality of the trajectories of the engine-speed change are stored, as learned values, in the storage medium 20a such that each of the learned values is associated with the corresponding operating conditions of the engine 20 and/or the accessories 65.

Figure 9B:
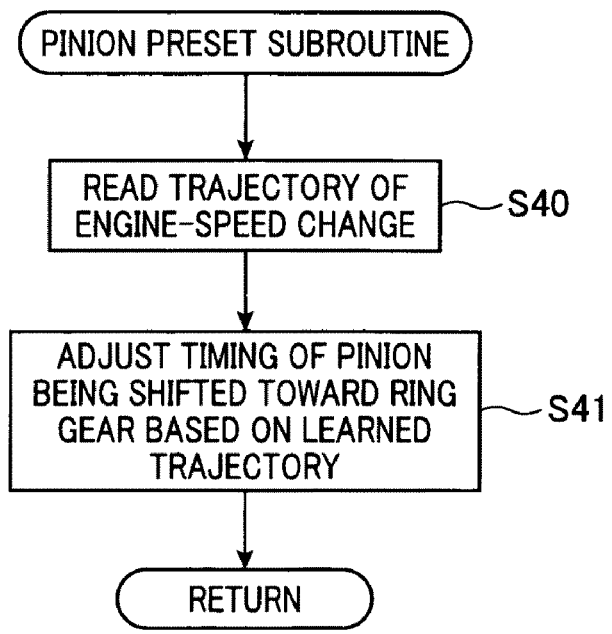
FIG. 9B is a flowchart schematically illustrating a second pinion preset subroutine according to the seventh modification of the second embodiment.

Thereafter, when carrying out the pinion preset subroutine, the ECU 20 can be programmed to read one of the plurality of learned trajectories of the engine-speed change stored in the storage medium 20a; this one of the plurality of learned values corresponds to the current operating conditions of the engine 20 and/or the accessories 65 in step S40 of FIG. 9B. Thereafter, the ECU 20 can be programmed to adjust the timing of the pinion 13 being shifted toward the ring gear 23 based on the one of the learned trajectories of the engine-speed change to thereby adjust the timing of the pinion 13 being engaged with the ring gear 23 in step S41.

This configuration achieves an advantage of rapidly estimating the trajectory of the engine-speed change during the engine 21 coasting while reducing the computing load of the ECU 20.

In each of the first and second embodiments, the engine starting system is designed such that the crank angle sensor 29 measures the rotational speed of the engine 21, but the present invention is not limited thereto.

Specifically, a sensor designed to directly measure the rotational speed of a pulley coupled to the crankshaft 22 or a sensor, which will be referred to as pulley rotation sensor, designed to directly measure the rotational speed of the ring gear 23 can be used as means for measuring the rotational speed of the engine 21 in place of or in addition to the crank angle sensor 29. In these sensors, the sensor, which will be referred to as ring-gear rotation sensor, designed to directly measure the rotational speed of the ring gear 23 can be preferably used as means for measuring the rotational speed of the engine 21. This is because the ring-gear rotation sensor is designed to pick up a change in a previously formed magnetic field according to the rotation of teeth formed on the outer circumference of the ring gear 23; the number of the teeth formed on the outer circumference of the ring gear 23 is greater than the number of the teeth of the reluctor disc of the crank angle sensor and that of teeth formed on the outer circumference of the pulley.

In each of the first and second embodiments, the crank-angle measurement resolution R can be set to a desired angle except for the crank angle of 30 degrees.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A system that presets a pinion of a starter on a ring gear mounted on an output shaft of an internal combustion engine during the internal combustion engine coasting by engine stop control, and that rotates, after the preset of the pinion on the ring gear, the pinion to thereby crank the internal combustion engine, the system comprising:

an angle sensor that outputs a pulse each time the output shaft rotates by a preset angle;

a calculator that calculates speed-change information indicative of a change in a speed of rotation of the output shaft based on the pulses outputted from the angle sensor;

a determiner that determines, based on the speed-change information, whether at least one of the pulses outputted from the angle sensor represents a proper timing for the preset of the pinion with the ring gear; and a pinion engaging unit that shifts the pinion toward the ring gear so that the pinion is engaged with the ring gear when it is determined that the at least one of the pulses outputted from the angle sensor represents the proper timing for the preset of the pinion with the ring gear.

2. The system according to claim 1, wherein the determiner is configured to determine, based on the speed-change information, whether each of the pulses outputted from the angle sensor represents, as the proper timing for the preset of the pinion with the ring gear, a last pulse during a forward rotation of the output shaft, and the pinion engaging unit is configured to shift the pinion toward the ring gear so that the pinion is engaged with the ring gear when it is determined that one pulse outputted from the angle sensor as the at least one pulse represents the last pulse during the forward rotation of the output shaft.

3. The system according to claim 2, wherein the calculator is configured to calculate a present value of any one of an angular velocity of the output shaft and a rotational speed of the internal combustion engine as the speed of rotation of the output shaft each time one of the pulses is outputted as a present pulse from the angle sensor, and wherein, each time the calculator calculates the present value of any one of the angular velocity of the output shaft and the rotational speed of the internal combustion engine, the determiner is configured to:
 estimate, based on the present value of any one of the angular velocity of the output shaft and the rotational speed of the internal combustion engine, a next value of any one of the angular velocity of the output shaft and the rotational speed of the internal combustion engine to be calculated by the calculator; and
 determine, based on the estimated next value, whether the present pulse outputted from the angle sensor represents, as the proper timing for the preset of the pinion with the ring gear, the last pulse during the forward rotation of the output shaft.

4. The system according to claim 3, wherein, each time the calculator calculates the present value of any one of the angular velocity of the output shaft and the rotational speed of the internal combustion engine, the determiner is configured to estimate the next value of any one of the angular velocity of the output shaft and the rotational speed of the internal combustion engine to be calculated by the calculator based on the present value of any one of the angular velocity of the output shaft and the rotational speed of the internal combustion engine, a friction torque of the internal combustion engine, and a previously determined inertia of the internal combustion engine.

5. The system according to claim 3, wherein, each time the calculator calculates the present value of any one of the angular velocity of the output shaft and the rotational speed of the internal combustion engine, the determiner is configured to:
 determine whether the estimated next value is a negative value; and
 when it is deter mined that the estimated next value is a negative value, determine that present pulse outputted from the angle sensor is the last pulse during the forward rotation of the output shaft, the present pulse corresponding to the present value of any one of the angular velocity of the output shaft and the rotational speed of the internal combustion engine.

6. The system according to claim 2, wherein, each time one of the pulses is outputted as a present pulse from the angle sensor, the determiner is configured to:
 estimate, based on the change in the speed of rotation of the output shaft based on the pulses that have been outputted from the angle sensor, a trajectory of the change in any one of the angular velocity of the output shaft and the rotational speed of the internal combustion engine; and
 estimate, based on the trajectory of the change in the speed of rotation of the internal combustion engine, a value of any one of the angular velocity of the output shaft and the rotational speed of the internal combustion engine when a next pulse is outputted from the angle sensor;
 determine whether the estimated value is a negative value; and
 when it is determined that the estimated value is a negative value, determine that the present pulse outputted from the angle sensor is the last pulse during the forward rotation of the output shaft.

7. The system according to claim 1, wherein the calculator is configured to calculate a present value of any one of an angular velocity of the output shaft and a rotational speed of the internal combustion engine as the speed of rotation of the output shaft each time one of the pulses is outputted as a present pulse from the angle sensor, and wherein, each time the calculator calculates the present value of any one of the angular velocity of the output shaft and the rotational speed of the internal combustion engine, the determiner is configured to:
 estimate, based on the present value of any one of the angular velocity of the output shaft and the rotational speed of the internal combustion engine, a next value of any one of the angular velocity of the output shaft and the rotational speed of the internal combustion engine to be calculated by the calculator;
 determine whether the estimated next value is within a positive range of the change in the speed of rotation of the output shaft, the positive range being equal to or close to zero; and
 when it is determined that the estimated next value is within the positive range of the change in the speed of rotation of the output shaft, determine that present pulse outputted from the angle sensor represents the proper timing for the preset of the pinion with the ring gear, the present pulse corresponding to the present value of any one of the angular velocity of the output shaft and the rotational speed of the internal combustion engine.

8. A system that presets a pinion of a starter on a ring gear mounted on a output shaft of an internal combustion engine during the internal combustion engine coasting by engine stop control, and that rotates, after the preset of the pinion on the ring gear, the pinion to thereby crank the internal combustion engine, the system comprising:
 an engine-speed calculator that calculates a rotational speed of the internal combustion engine based on rotation of the output shaft;
 an estimator that estimates, based on the rotational speed of the internal combustion engine, a trajectory of a change in the rotational speed of the internal combustion engine during the internal combustion engine coasting; and
 a controller that adjusts, based on the trajectory of the change in the rotational speed estimated by the estimator, a timing of the pinion being engaged with the ring gear.

9. The system according to claim 8, wherein the engine-speed calculator is provided with a rotation sensor that outputs a signal each time the output shaft rotates by a preset angle, each time the rotation sensor outputs the signal, the engine-speed calculator is configured to calculate, based on a time required for the output shaft to rotate by the present angle, a value of an instantaneous rotational speed as the rotational speed of the internal combustion engine, and the estimator is configured to estimate the trajectory of the change in the rotational speed based on the values of the instantaneous rotational speed during the instantaneous rotational speed gradually dropping.

10. The system according to claim 9, wherein, when the instantaneous rotational speed reaches a monotone decreasing period, the estimator is configured to start the estimation of the trajectory of the change in the rotational speed based on the values of the instantaneous rotational speed, the monotone decreasing period representing a period within which the instantaneous rotational speed monotonously decreases toward zero.

11. The system according to claim 9, wherein the estimator is configured to:
 calculate a function indicative of a relationship between the instantaneous rotational speed and time within a period previous to a monotonous decreasing period, the monotone decreasing period representing a period within which the instantaneous rotational speed monotonously decreases toward zero;

shift the function so as to adapt the function to a change of the instantaneous engine speed within the instantaneous rotational speed; and determine, as the trajectory of the change in the rotational speed, the function shifted to be adapted to the change of the instantaneous engine speed within the instantaneous rotational speed.

12. The system according to claim 8, wherein the estimator is configured to start of the estimation of the trajectory of the change in the rotational speed when the rotational speed of the internal combustion engine decreases up to a preset rotational speed.

13. The system according to claim 8, wherein the engine-speed calculator is provided with a rotation sensor, the rotation sensor includes a reluctor disk coupled to the output shaft to be integrally rotated therewith, the reluctor disk having a plurality of teeth spaced therebetween around an outer circumference of the reluctor disk, the rotation sensor being designed to output a pulse each time one tooth of the reluctor disk passes in front of the rotation sensor, the engine-speed calculator is configured to calculate, based on intervals of the pulses outputted from the rotation sensor, a plurality of values of the rotational speed of the internal combustion engine, and the estimator is configured to estimate, based on at least one of the plurality of values of the rotational speed of the internal combustion engine, the trajectory of the change in the rotational speed.

14. The system according to claim 8, wherein the controller is configured to estimate a timing at which the rotational speed of the internal combustion engine reaches zero, and engage the pinion with the ring gear at the estimated timing or therearound.

15. The system according to claim 8, wherein the controller is configured to determine a timing of shifting the pinion toward the ring gear based on the trajectory of the change in the rotational speed estimated by the estimator and a time required for the pinion to be engaged with the ring gear to thereby adjust the timing of the pinion being engaged with the ring gear.

16. The system according to claim 8, further comprising a storage unit that stores, as a learned trajectory of the change in the rotational speed, the trajectory of the change in the rotational speed previously estimated by the estimator, wherein the controller is configured to adjust, based on the learned trajectory of the change in the rotational speed as the trajectory of the change in the rotational speed estimated by the estimator, the timing of the pinion being engaged with the ring gear.

17. The system according to claim 8, wherein the system is installed in a motor vehicle installed with an accessory driven by the internal combustion engine, and the estimator is configured to correct the trajectory of the change in the rotational speed estimated by the estimator based on at least one of an operating condition of the internal combustion engine and an operating condition of the accessory.

\* \* \* \* \*